(12) United States Patent
Lee

(10) Patent No.: US 10,261,900 B2
(45) Date of Patent: Apr. 16, 2019

(54) DATA CACHE SYSTEM, RECORDING MEDIUM AND METHOD

(71) Applicant: Rakuten, Inc., Shinagawa-ku, Tokyo (JP)

(72) Inventor: SeungHee Lee, Shinagawa-ku (JP)

(73) Assignee: Rakuten, Inc., Setagaya-Ku, Tokyo (JP)

( * ) Notice: Subject to any disclaimer, the term of this patent is extended or adjusted under 35 U.S.C. 154(b) by 309 days.

(21) Appl. No.: 14/406,459

(22) PCT Filed: Mar. 29, 2013

(86) PCT No.: PCT/JP2013/059756
§ 371 (c)(1),
(2) Date: Dec. 8, 2014

(87) PCT Pub. No.: WO2014/155737
PCT Pub. Date: Oct. 2, 2014

(65) Prior Publication Data
US 2015/0134910 A1   May 14, 2015

(51) Int. Cl.
*G06F 9/45* (2006.01)
*G06F 12/08* (2016.01)
(Continued)

(52) U.S. Cl.
CPC .... *G06F 12/0802* (2013.01); *G06F 2212/603* (2013.01)

(58) Field of Classification Search
CPC ........ G06Q 10/02; G06Q 20/36; G06Q 20/38; G06Q 20/3821; G06Q 20/3823
(Continued)

(56) References Cited

U.S. PATENT DOCUMENTS 8,424,001 B2 * 4/2013 Burckart ............. G06F 9/45558
709/213
9,251,478 B2 * 2/2016 Francois ............ G06Q 30/0635
(Continued)

FOREIGN PATENT DOCUMENTS

| JP | 2004-527820 A | 9/2004 |
|---|---|---|
| JP | 2005-157605 A | 6/2005 |
| JP | 4815934 B2 | 11/2011 |

OTHER PUBLICATIONS

International Search Report for PCT/JP2013/059756 dated May 7, 2013.

*Primary Examiner* — Mohamed M Gebril
(74) *Attorney, Agent, or Firm* — Sughrue Mion, PLLC

(57) ABSTRACT

A transmission device (300) comprising a data cache system is provided with a data acquisition part (315) for acquiring volume data indicating the volume of transactionable products or services transmitted from a server. The transmission device (300) is provided with a saving part (320) for saving the acquired volume data in an information memory (390) as cache data, and a request acquisition part (330) for acquiring requests seeking volume output. The transmission device (300) is provided with a determination part (350) for determining whether or not the cache data is valid based on the elapsed time from when the cache data was received or saved and the volume indicated by the cache data, when a request is acquired. When the determination is that the cache data is invalid, the data acquisition part (315) receives new volume data from the server, and the saving part (320) saves the new volume data as new cache data in the information memory (390).

10 Claims, 16 Drawing Sheets

(51) Int. Cl.
*G06F 12/0808* (2016.01)
*G06F 12/0815* (2016.01)
*G06F 12/0802* (2016.01)

(58) Field of Classification Search
USPC .......................................................... 711/118
See application file for complete search history.

(56) References Cited

U.S. PATENT DOCUMENTS

| | | | |
|---|---|---|---|
| 2004/0054751 A1* | 3/2004 | Weissert | G06F 17/30286 709/217 |
| 2005/0144115 A1* | 6/2005 | Brett | G06Q 10/02 705/37 |
| 2007/0055554 A1* | 3/2007 | Sussman | G06Q 10/02 705/5 |
| 2010/0198628 A1* | 8/2010 | Rayner | G06Q 10/025 705/6 |

* cited by examiner

FIG. 4

SEARCH RESULT DISPLAY SCREEN

THE FOLLOWING FLIGHTS WERE FOUND MATCHING THE BELOW CONDITIONS.
DEPARTURE : HANEDA
DESTINATION : SAPPORO
DEPARTURE DATE : 2013/03/01

| FLIGHT NUMBER | AIRLINE COMPANY | NUMBER OF EMPTY SEATS | RESERVATIONS |
|---|---|---|---|
| ABC123 | ABC Airline | 3 | RESERVATION SCREEN |

FIG. 8

CACHE TABLE

| SAVING DATE AND TIME | CACHE DATA | | | | | |
|---|---|---|---|---|---|---|
| | DEPARTURE DATE | DEPARTURE PLACE | ARRIVAL PLACE | FLIGHT NUMBER | AIRLINE COMPANY | NUMBER OF EMPTY SEATS |
| 2012/01/01 00:00:00 | 2013/03/01 | HANEDA | SAPPORO | ABC123 | ABC Airline | 3 |
| ... | ... | ... | ... | ... | ... | ... |

FIG. 10

BUSY PERIOD TABLE

| BUSY PERIOD NAME | START DATE | END DATE |
|---|---|---|
| GOLDEN WEEK | 2013/04/27 | 2013/05/06 |
| NEW YEAR'S | 2013/12/28 | 2013/01/03 |
| ... | ... | ... |

FIG. 15

CACHE TABLE

| SAVING DATE AND TIME | CACHE DATA | | | | | |
|---|---|---|---|---|---|---|
| | DEPARTURE DATE | DEPARTURE PLACE | ARRIVAL PLACE | FLIGHT NUMBER | AIRLINE COMPANY | NUMBER OF EMPTY SEATS |
| 2012/01/01 00:00:00 | 2013/03/01 | HANEDA | SAPPORO | ABC123 | ABC Airline | 9 |
| 2012/01/01 00:00:00 | 2013/03/01 | HANEDA | SAPPORO | DEF123 | DEF Airline | 3 |
| 2012/01/01 00:00:00 | 2013/03/01 | HANEDA | SAPPORO | GHI123 | GHI Airline | 9 |
| 2012/01/01 00:00:00 | 2013/03/01 | HANEDA | SAPPORO | JKL123 | JKL Airline | 0 |
| ... | ... | ... | ... | ... | ... | ... |

DATA CACHE SYSTEM, RECORDING MEDIUM AND METHOD

CROSS REFERENCE TO RELATED APPLICATIONS

This application is a National Stage of International Application No. PCT/JP2013/059756 filed Mar. 29, 2013, the contents of all of which are incorporated herein by reference in their entirety.

TECHNICAL FIELD

The present invention relates to a data cache system, recording medium and method.

BACKGROUND ART

A cache server for acquiring data from an external server within a prescribed time interval, storing the acquired data as cache data during the prescribed time and replying with the stored data in accordance with a request from an external device has been known from before (for example, see Patent Literature 1).

CITATION LIST

Patent Literature

Patent Literature 1: Japanese Patent No. 4815934

SUMMARY OF INVENTION

Technical Problem

With the art of Patent Literature 1, if the time interval for acquiring data from an external server is shortened, consistency (hereafter referred to as accuracy) between data possessed by the external server and the cache data improves, but communication volume with the external server increases. In contrast, the problem exists that if the time interval is lengthened, communication volume with the external server decreases but the accuracy of the cache data drops.

In consideration of the foregoing problem, it is an objective of the present disclosure to provide a data cache system, recording medium and method with which it is possible to improve the accuracy of cache data while controlling increases in data volumes.

Solution to Problem

In order to achieve the above objective, the data cache system according to a first aspect of the present disclosure is a data cache system for saving in a memory device data indicating the volume of transactionable products or services, the system comprises:

a data acquisition part for acquiring volume data indicating the volume of the transactionable products or services transmitted from a server that receives transactions of the products or services;

a saving part for saving the acquired volume data in the memory device as cache data;

a request acquisition part for acquiring a request seeking output of data indicating the volume of the transactionable products or services; and a determination part for determining, when the request is acquired, whether or not the cache data is valid, based on the elapsed time from the time the cache data was acquired or saved, and the volume indicated by the cache data;

wherein the data acquisition part acquires new volume data transmitted from the server when it is determined that the cache data is invalid; and the saving part saves the acquired new volume data as new cache data in the memory device.

In addition, the data cache system according to the first aspect, may further comprise:

a data output part for outputting the cache data determined to be valid when the cache data is determined to be valid, and for outputting the new cache data when the cache data is determined to be invalid.

In addition, in the data cache system according to the first aspect, the determination part may comprise:

a period changing part for extending or shortening a valid period predetermined as a period in which the cache data is determined to be valid, based on the volume indicated by the cache data; and an actual determination part for determining that the cache data is valid when the elapsed time from the time that the cache data was acquired or saved is not longer than the extended or shortened valid period, and for determining that the cache data is invalid when the elapsed time is longer than the extended or shortened valid period.

In addition, the data cache system according to the first aspect may be such that the period changing part shortens the valid period when the volume indicated by the cache data is not larger than a predetermined first threshold value.

In addition, the data cache system according to the first aspect may be such that the period changing part extends the valid period when the volume indicated by the cache data is a predetermined threshold value and is equal to or larger than a second threshold value which is larger than the first threshold value.

In addition, the data cache system according to the first aspect may be such that:

when submission data is acquired indicating submission of a transaction of products or services whose volume is indicated by the output cache data, the data acquisition part acquires the volume data of the product or service for which there was a submission;

and may further comprises a calculation part for calculating the difference between the volume indicated by cache data output prior to acquisition of the submission data and the volume indicated by the volume data acquired after acquisition of the submission data, for the product or service for which there was a submission; and a threshold value changing part for changing one or more of the first threshold value and the second threshold value so that the calculated difference shrinks.

In addition, the data cache system according to the first aspect may be such that:

the data acquisition part acquires volume data indicating the volume of products or services searched based on a search date included in search condition data used in searching products or services, any one or more of a projected sales date, projected shipping date and projected arrival date of a product, or a supply date of a service; and the period changing part shortens or extends the valid period of the cache data based on any one or more of a search date indicated by search condition data indicating the search conditions, and the length of the period until the search date.

In addition, the data cache system according to the first aspect may be such that:

the request acquisition part acquires search conditions used in searching products or services, and a request seeking output of data indicating the transactionable volume of searched products and services;

the data acquisition part acquires volume data indicating transactionable volumes transmitted from the server, for multiple products or services searched based on the search conditions; and the period changing part shortens the valid period of cache data indicating a volume larger than a predetermined third threshold value, when one or more of the multiple volumes indicated by volume data saved as the cache data is not larger than the third threshold value.

In order to achieve the above objective, the program according to a second aspect of the present disclosure is a program for saving in a memory device data indicating the volume of transactionable products or services, the program causing a computer to function as:

a data acquisition part for acquiring volume data indicating the volume of the transactionable products or services transmitted from a server that receives transactions of the products or services;

a saving part for saving the acquired volume data in the memory device as cache data;

a request acquisition part for acquiring a request seeking output of data indicating the volume of the transactionable products or services; and a determination part for determining, when the request is acquired, whether or not the cache data is valid, based on the elapsed time from the time the cache data was acquired or saved, and the volume indicated by the cache data;

wherein the data acquisition part acquires new volume data transmitted from the server when it is determined that the cache data is invalid; and the saving part saves the acquired new volume data as new cache data in the memory device.

In order to achieve the above objective, the computer-readable recording medium according to a third aspect of the present disclosure is a computer-readable recording medium on which is recorded a program for saving in a memory device data indicating the volume of transactionable products or services, the program causing a computer to function as:

a data acquisition part for acquiring volume data indicating the volume of the transactionable products or services transmitted from a server that receives transactions of the products or services;

a saving part for saving the acquired volume data in the memory device as cache data;

a request acquisition part for acquiring a request seeking output of data indicating the volume of the transactionable products or services; and a determination part for determining, when the request is acquired, whether or not the cache data is valid, based on the elapsed time from the time the cache data was acquired or saved, and the volume indicated by the cache data;

wherein the data acquisition part acquires new volume data transmitted from the server when it is determined that the cache data is invalid; and the saving part saves the acquired new volume data as new cache data in the memory device.

In order to achieve the above objective, the method according to a fourth aspect of the present disclosure is a method for saving in a memory device data indicating the volume of transactionable products or services, the method including:

a data acquisition step for acquiring volume data indicating the volume of the transactionable products or services transmitted from a server that receives transactions of the products or services;

a first saving step for saving the acquired volume data in the memory device as cache data;

a request acquisition step for acquiring a request seeking output of data indicating the volume of the transactionable products or services; and a determination step for determining, when the request is acquired, whether or not the cache data is valid, based on the elapsed time from the time the cache data was acquired or saved, and the volume indicated by the cache data;

a data reacquisition step for acquiring new volume data transmitted from the server when it is determined that the cache data is invalid; and a second saving step for saving the acquired new volume data as new cache data in the memory device.

Advantageous Effects of Invention

With the data cache system, recording medium and method according to the present disclosure, it is possible to improve the accuracy of the cache data while controlling increases in communication volume.

BRIEF DESCRIPTION OF DRAWINGS

FIG. 4 is a drawing showing one example of a search result display screen;

FIG. 8 is a drawing showing one example of a cache table stored by the transmission device according to the first preferred embodiment;

FIG. 10 is a drawing showing one example of a busy period table stored by the transmission device according to a second preferred embodiment;

FIG. 15 is a drawing showing one example of a cache table stored by the transmission device according to the fourth preferred embodiment.

DESCRIPTION OF EMBODIMENTS

Figure 1:
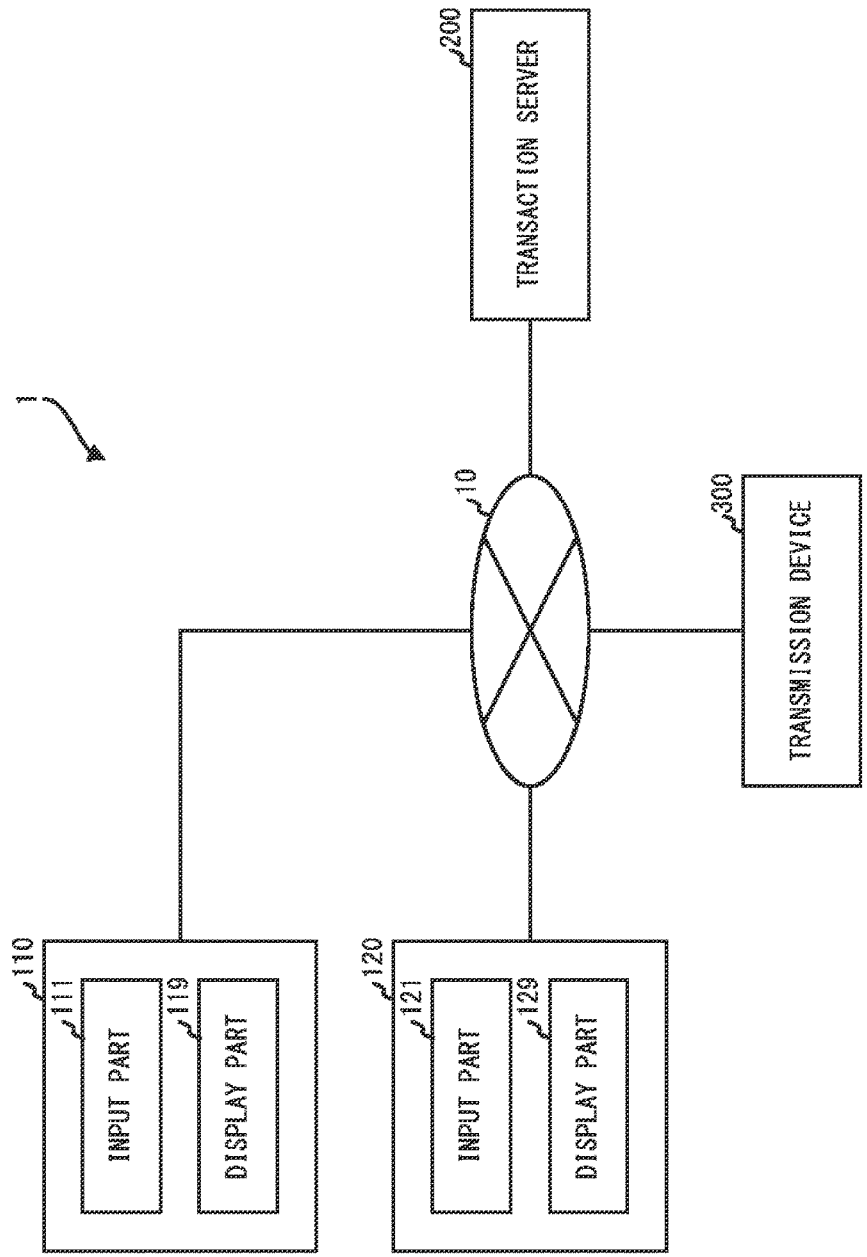
FIG. 1 is a system composition diagram showing one example of the composition of a data cache system.

Below, preferred embodiments of the present disclosure are described with reference to the attached drawings.

First Preferred Embodiment

A data cache system 1 according to a first preferred embodiment of the present disclosure exhibits a volume of transactionable services.

Services shall mean labor or convenience undertaken for another person, independently and with the intent of being a business transaction. In this preferred embodiment, the explanation shall take as one example of a service the providing of an airline flight conveying a user from a given location to another location by aircraft on a given day. In this preferred embodiment, the explanation will be such that if the flight differs (that is, if any one or more of the departure date, departure place, destination or aircraft differs), a different service has been rendered. Consequently, when speaking of the volume that can be provided for a given flight, the explanation will speak of the number of empty seats on that flight.

In this preferred embodiment, the explanation shall cite as one example of a transaction the transaction of making a reservation for providing the service. As one example of a transaction of making a reservation for providing the service, the explanation shall cite the transaction of reserving an empty seat on an airline flight, that is to say the transaction of reserving issuance of an airline flight ticket. The airline flight may be a domestic flight for which the departure and arrival locations are geographical points in the same country, or may be an overseas flight for which the departure and arrival locations are geographical points in different countries. Consequently, airline tickets for which issuance is reserved may be domestic airline tickets that are airline tickets for domestic flights, or may be overseas airline tickets that are airline tickets for overseas flights.

A data cache system 1 comprises terminal devices 110 and 120, a transaction server 200 and a transmission device 300, all connected so as to be capable of communication with each other via a computer communication network 10 (hereafter called a communication network 10).

The communication network 10 comprises the Internet, for example. The communication network 10 may also comprise a LAN (Local Area Network) or a public circuit network.

The terminal device 110 comprises, for example, a personal computer equipped with an input part 111 such as a keyboard, mouse and/or the like, and a display part 119 such as an LCD (Liquid Crystal Display) and/or the like. The terminal device 120 comprises an input part 121 and a display part 129 having the same composition as the input part 111 and the display part 119 possessed by the terminal device 110.

The terminal devices 110 and 120 have mutually similar compositions and execute the same actions, so below, the explanation shall primarily be for the terminal device 110.

Figure 2:
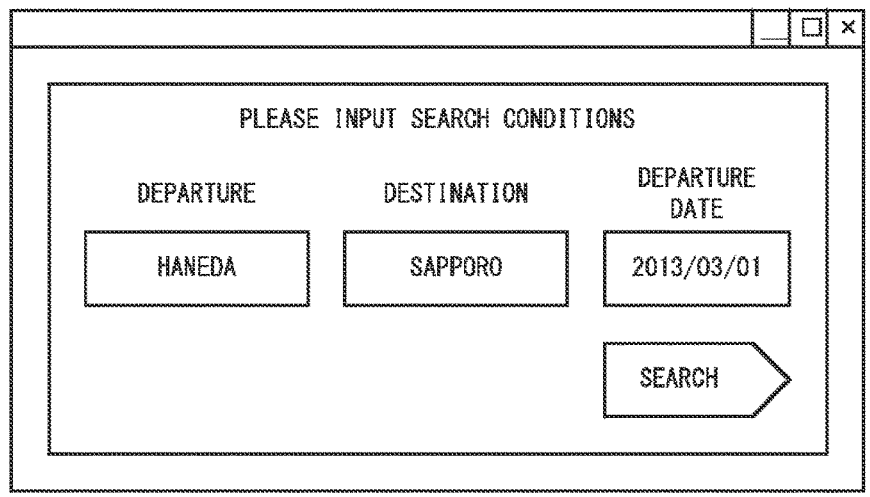
FIG. 2 is a drawing showing one example of a search screen.

The terminal device 110 displays a search screen such as that shown in FIG. 2. The search screen is used for searching the reservable number of empty seats on airline flights. When the input part 111 is operated by a user, the terminal device 110 inputs search conditions for airline flights in accordance with the operation and transmits to the transmission device 300 data indicating the input search conditions (hereafter called search condition data).

Figure 3:
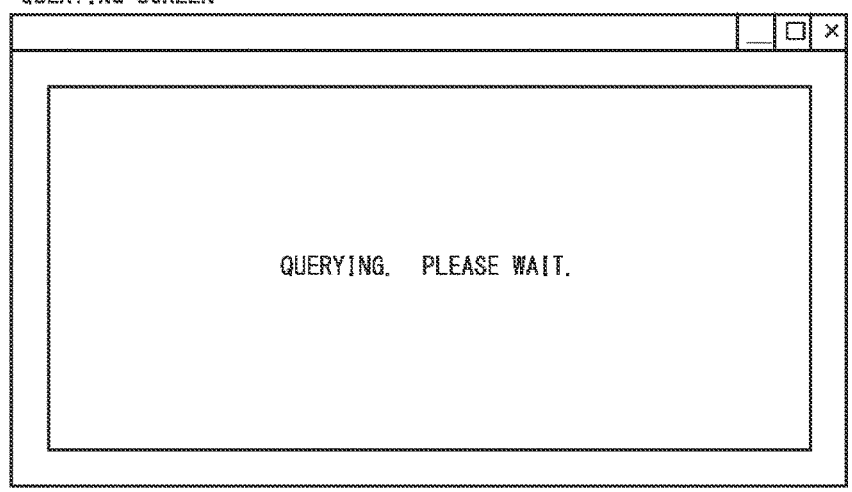
FIG. 3 is a drawing showing one example of a querying screen.

Following this, the terminal device 110 displays a querying screen such as that shown in FIG. 3. The querying screen indicates that data is being queried. Next, the terminal device 110, upon received data indicating search results including empty seats on airline flights (hereafter called search result data) from the transmission device 300, concludes display on the querying screen. Consequently, when it takes time from transmission of the search condition data until reception of the search result data, the querying screen continues to be displayed to the user, so user convenience declines.

Following this, the terminal device 110 displays a search result display screen such as that shown in FIG. 4, based on the received data, on the display part 119. The search result display screen indicates results of searching for the number of reservable empty seats on airline flights based on the search conditions.

The transaction server 200 receives the search condition data from the transmission device 300. Next, the transaction server 200 returns to the transmission device 300 data (that is to say, the search result data) indicating the number of empty seats on airline flights matching the search conditions indicated by the search condition data and numbers identifying the airline flights (hereafter called flight numbers).

In addition, the transaction server 200 receives from the transmission device 300 a flight number and information identifying the user reserving the airline flight (hereafter called the user ID). Next, the transaction server 200 confirms whether or not empty seats exist on the airline flight identified by the flight number. Following this, upon confirming that empty seats exist, the transaction server 200 receives reservations for the airline flight by the user identified by the user ID.

Figure 5:
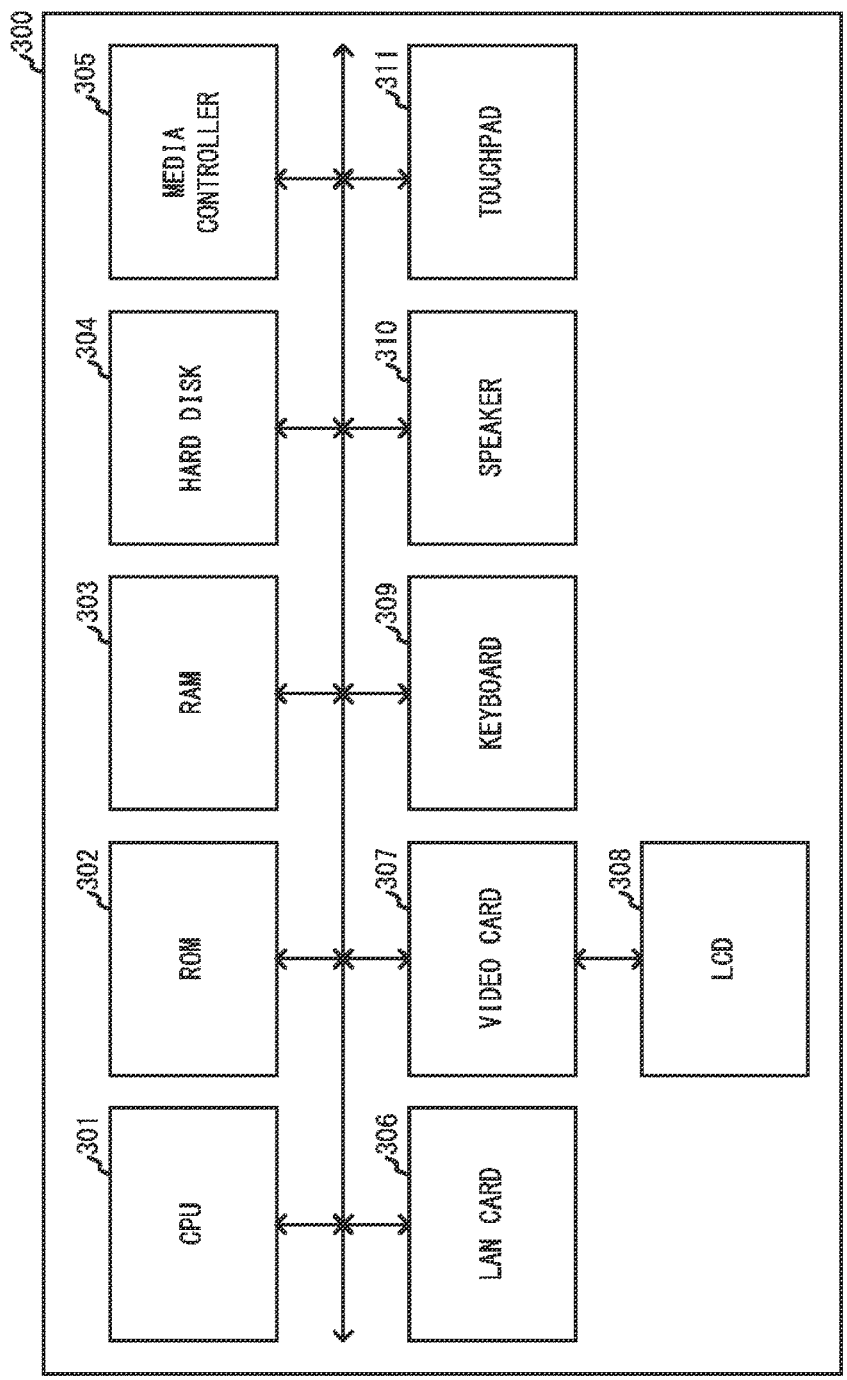
FIG. 5 is a hardware composition diagram showing one example of a transmission device.

The transmission device 300 comprises server equipment as shown in FIG. 5. The transmission device 300 comprises a CPU (Central Processing Unit) 301, ROM (Read Only Memory) 302, RAM (Random Access Memory) 303, a hard disk 304, a media controller 305, a LAN (Local Area Network) card 306, a video card 307, an LCD (Liquid Crystal Display) 308, a keyboard 309, a speaker 310 and a touchpad 311.

The CPU 301 accomplishes total control of the transmission device 300 by executing programs in accordance with programs stored in the ROM 302 or the hard disk 304. The RAM 303 is a work memory for temporarily storing data that is a target of processing, during execution of programs by the CPU 301.

The hard disk 304 is an information memory device for storing tables preserving various types of data. The transmission device 300 may also be provided with flash memory in place of the hard disk 304.

The media controller 305 reads various types of data and programs from memory media including flash memory, CD (Compact Disc), DVD (Digital Versatile Disc) and Blu-ray® Disc.

The LAN card 306 sends and receives data between the terminal devices 110 and 120 connected via the communication network 10. The keyboard 309 and touchpad 311 input signals in accordance with user operation.

The video card 307 depicts (in other words, renders) images based on digital signals output from the CPU 301 and also outputs image signals indicating rendered images. The LCD 308 displays images in accordance with image signals output from the video card 307. The transmission device 300 may also be provided with a PDP (Plasma Display Panel) or EL (Electroluminescence) display in place of the LCD 308. The speaker 310 outputs audio based on signals output from the CPU 301.

Next, functions possessed by the transmission device 300 are described.

Figure 6:
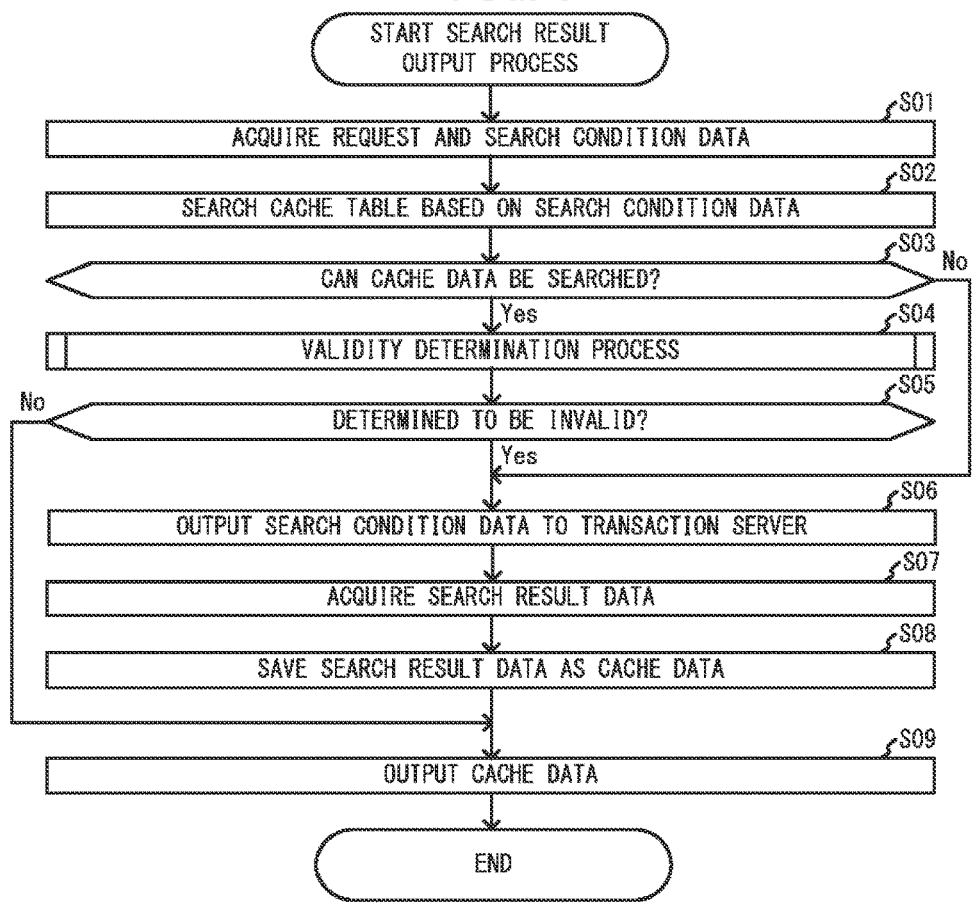
FIG. 6 is a flowchart showing one example of a search result output process executed by a transmission device according to a first preferred embodiment.

The CPU 301 executes a search result output process shown in FIG. 6. The search result output process is a process for outputting to the LAN card 306 shown in FIG. 5 data (in other words, search result data) indicating search results for airline flights, with the terminal device 110 or 120 as the destination. The LAN card 306 transmits the output search result data to the terminal device 110 or 120 specified as the destination.

Figure 7:
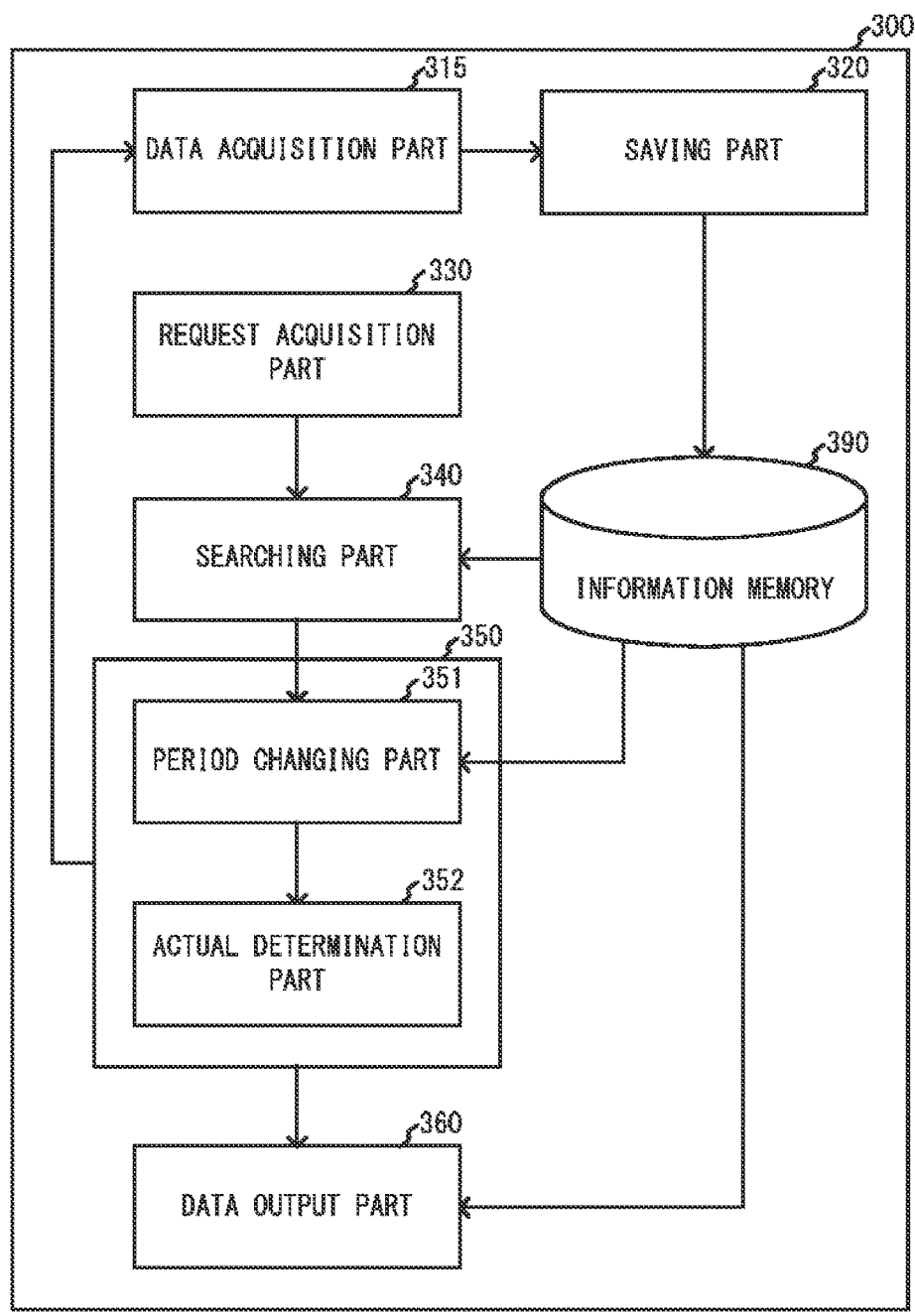
FIG. 7 is a function block diagram showing one example of functions possessed by the transmission device according to the first preferred embodiment.

By executing this process, the CPU 301 functions as a data acquisition part 315, saving part 320, request acquisition part 330, searching part 340, determination part 350 and data output part 360, as shown in FIG. 7. In addition, the hard disk 304 shown in FIG. 4, working with the CPU 301, functions as an information memory 390.

Before describing the data acquisition part 315, saving part 320, request acquisition part 330, searching part 340, determination part 350 and data output part 360, the information memory 390 is described.

The information memory 390 stores a cache table such as that shown in FIG. 8. In the cache table, search result data received from the transaction server 200 is stored as cache data. In the cache table, multiple items of cache data and information indicating the saving date and time of the cache data are stored, associated with each other. The search result data stored as cache data is data in which information respectively indicating the departure date, departure location, arrival location, flight number, airline company and number of empty seats of an airline flight is associated with each other.

The data acquisition part 315 acquires from the LAN card 306 the search result data the LAN card 306 shown in FIG. 5 received from the transaction server 200.

The saving part 320 saves the search result data acquired by the data acquisition part 315 in the cache table of the information memory 390 as cache data.

When the LAN card 306 receives search condition data and a transmission request seeking transmission of data indicating the number of reservable empty seats of the searched airline flight from the terminal device 110 or 120, the request acquisition part 330 acquires the search condition data and transmission request from the LAN card 306.

The searching part 340 searches cache data stored in the cache table based on the search conditions indicated by the search condition data.

The determination part 350 determines whether or not the cache data searched by the searching part 340 is valid. The cache data being valid means that when the transaction server 200 searched the number of empty seats on an airline flight at the determination time under search conditions used in a search of the cache data, the probability that the number of empty seats exists or that the number of empty seats is larger than a prescribed number is larger than a prescribed probability value. That is to say, this means that when a reservation for one seat or not less than a prescribed number of seats for the airline flight for which the number of empty seats is indicated by the cache data is made to the transaction server 200 at the determination time, one or at least a prescribed number of empty seats exists so the probability that the submission is accepted by the transaction server 200 is larger than a prescribed probability value. A person skilled in the art can determine an appropriate value for this prescribed probability value through experimentation.

The determination part 350 makes the determination of whether or not the cache data is valid based on the elapsed time from the saving time of the cache data and the number of empty seats indicated by the cache data.

The determination part 350 possesses a period changing part 351 and an actual determination part 352. The period changing part 351 makes the period when cache data is determined to be valid (hereafter called the valid period) a predetermined period (hereafter called the set valid period). The period changing part 351 lengthens or shortens the valid period that is the set valid period based on the volume indicated by the cache data. Information indicating the set valid period is stored in advance in the information memory 390.

When the elapsed time length from the saving time of the cache data is not longer than the lengthened or shortened valid period length, the actual determination part 352 determines that the cache data is valid. In contrast, when the elapsed time is longer than the lengthened or shortened valid period, the actual determination part 352 determines that the cache data is invalid.

When it is determined that the cache data is valid, the data output part 360 outputs the cache data determined to be valid to the LAN card 306 with the terminal device 110 or 120 as the destination.

In contrast, when it is determined that the cache data is not valid, the data output part 360 outputs the search condition data used in searching for the cache data to the LAN card 306 with the transaction server 200 as the destination. Following this, the data acquisition part 315 acquires new search result data transmitted from the transaction server 200 and, when the saving part 320 saves the new search result data in the information memory 390 as cache data, outputs the new cache data to the LAN card 306.

When the LAN card 306 receives search condition data and a transmission request from the terminal device 110 or 120, the CPU 301 starts execution of the search result output process shown in FIG. 6.

Here, the explanation will be for a case in which the transmission device 300 has received search condition data and a transmission request for the first time. The explanation will be for a case in which it is the terminal device 110 that has transmitted the search condition data and transmission request to the transmission device 300, and in which when the transmission device 300 has received the search condition request and the transmission request, no data is stored in the cache table shown in FIG. 8.

First, the request acquisition part 315 acquires the search condition data and transmission request from the LAN card 306 (step S01).

Here, the explanation will take as an example a case in which the search conditions indicated by the search condition data are "departure from Haneda, arrival at Sapporo, with a departure date of Mar. 1, 2013".

Next, the searching part 340 searches the cache data from the cache table stored by the information memory 390 based on the search conditions indicated by the acquired search condition data (step S02). At this time, no data is stored in the cache table, so the searching part 340 cannot search the cache table.

Following this, the determination part 350 determines that the cache data cannot be searched (step S03; No).

The data output part 360 outputs the search condition data acquired in step S01 to the LAN card 306 with the transaction server 200 as the destination (step S06). Following this, the LAN card 306 transmits the search condition data to the transaction server 200.

Below, the explanation will assume that the transaction server 200 searches for a single airline flight matching the search conditions "departure from Haneda, arrival at Sapporo, with a departure date of Mar. 1, 2013" indicated by the search condition data received, and that the searched airline flight has six empty seats.

The LAN card 306 receives search result data indicating the number of empty seats on the airline flight searched by the transaction server 200, from the transaction server 200. When the LAN card 306 receives the search result data, the data acquisition part 315 acquires the search result data from the LAN card 306 (step S07).

Next, the saving part 320 acquires the current date and time for example from the OS (operating system). Following this, the saving part 320 sets the acquired search result data as cache data and sets the acquired current date and time as the saving date and time of the cache data. Next, the saving part 320 associates the cache data and information indicating the saving date and time with each other, and saves this information in the cache table shown in FIG. 8 (step S08).

Following this, the data output part 360 outputs the cache data saved in step S08 to the LAN card 306 with the terminal device 110 as the destination (step S09), and then concludes execution of the search result output process. The LAN card 306 transmits the output cache data to the terminal device 110.

Next, the explanation will assume that five minutes after the terminal device 110 has transmitted the search condition data and transmission request to the transmission device 300, a transmission request and search condition data the same as the search condition data transmitted by the terminal device 110 is transmitted by the terminal device 120 to the transmission device 300.

When the LAN card 306 receives the search condition data and transmission request from the terminal device 120, the search result output process of FIG. 6 is again executed.

First, the process in step S01 that has already been explained is executed. Next, the searching part 340 searches cache data from the cache table stored by the information memory 390 based on the search conditions "departure from Haneda, arrival at Sapporo, with a departure date of Mar. 1, 2013" (step S02).

At this time, one item of cache data stored the previous time is stored in the information memory 390. This stored cache data indicates the entirety of departure from Haneda, arrival at Sapporo, and a departure date of Mar. 1, 2013. Consequently, the searching part 340 acquires this cache data through the search.

Following this, the determination part 350 determines that cache data can be searched (step S03; Yes).

Figure 9:
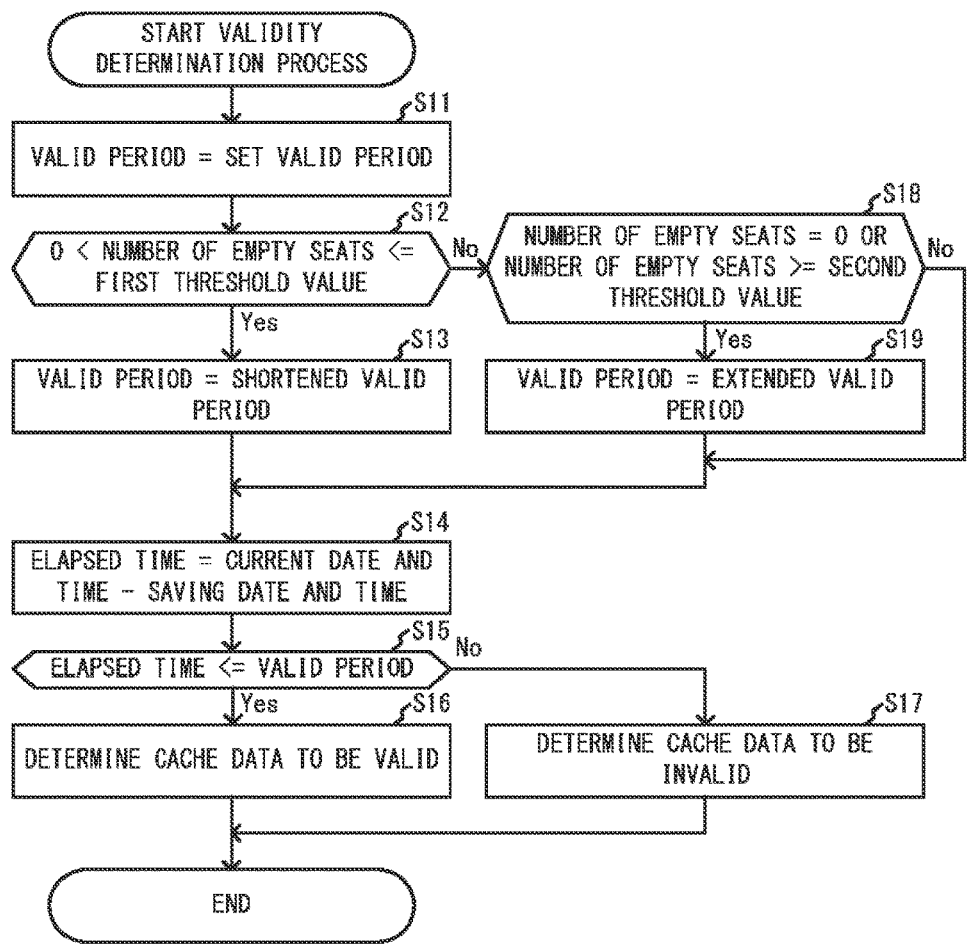
FIG. 9 is a flowchart showing one example of a determination process executed by the transmission device according to the first preferred embodiment.

Next, the determination part 350 executes a validity determination process shown in FIG. 9 (step S04). The validity determination process is a process for determining whether or not the searched cache data is valid.

When execution of the validity determination process starts, the period changing part 351 of the determination part 350 reads information indicating the set valid period stored in the information memory 390.

In this preferred embodiment, the explanation assumes that the set valid period is set to 30 minutes, but this is intended to by illustrative and not limiting. An appropriate value for the set valid period can be determined through experimentation by a person skilled in the art.

Next, the period changing part 351 makes the valid period of the cache data the set valid period (step S11).

Following this, the period changing part 351 determines whether or not the number of empty seats indicated by the cache data is larger than 0 and not larger than a first threshold value (step S12).

The first threshold value is a number of seats projected to be reserved by the time the set valid period from when the cache data was saved elapses. In this preferred embodiment, the explanation assumes that the first threshold value is six seats, but this is intended to be illustrative and not limiting. An appropriate value for the first threshold value can be determined through experimentation and/or the like by a person skilled in the art. For example, it would be fine to calculate the average value of the decline in the number of empty seats per unit time from the number of empty seats over multiple points in time, and to set as the first threshold value a value found by multiplying the calculated average value by the length of the set valid period.

Here, the searched cache data indicates three empty seats, so the period changing part 351 determines that the number of empty seats is larger than 0 and is equal to or less than the six seats that is the first threshold value (step S12; Yes).

Next, the period changing part 351 reads information indicating a shortened time stored in advance in the information memory 390. Next, the period changing part 351 sets the valid period of the cache data as a shortened valid period shortened by the shortened time (step S13).

In this preferred embodiment, the shortened time is set to 15 minutes, and the shortened valid period is 15 minutes, as found by shortening the valid period of 30 minutes by the shortened time of 15 minutes. But this is intended to by illustrative and not limiting, an appropriate value for the shortened time can be determined through experimentation by a person skilled in the art.

Next, the actual determination part 352 acquires the current date and time from the OS. Following this, the actual determination part 352 acquires the saving date and time indicated by information associated with the cache data searched in step S03 from the cache table shown in FIG. 8. Next, the actual determination part 352 calculates the elapsed time from the saving date and time of the cache data, by subtracting the saving date and time from the current date and time (step S14).

Following this, the actual determination part 352 determines whether or not the elapsed time length is not longer than the valid period length of the cache data (step S15).

The terminal device 120 transmitted the transmission request and the same search condition data as the search condition data transmitted by the terminal device 110, to the transmission device 300 five minutes after the terminal device 110 transmits the search condition data and transmission request to the transmission device 300. Consequently, the elapsed time is about five minutes.

Consequently, the actual determination part 352 determines that the elapsed time of about five minutes is shorter than the valid period of 15 minutes for the cache data (step S15; Yes), and determines that the cache data is valid (step S16).

By executing step S04, the determination part 350 determined that the cache data is not invalid (that is to say, is valid) (step S05; No). Consequently, the communication process from step S06 through step S08 is not executed. After the determination by the determination part 350, the data output part 360 immediately outputs the cache data searched in step S02 to the LAN card 306, specifying the terminal device 120 as the destination (step S09). Following this, execution of the search result output process concludes.

Consequently, the time from when the terminal device 120 transmits the search condition data and the transmission request until the cache data is received as search result data is shortened, and the time during which the querying screen shown in FIG. 3 is displayed is shortened.

Next, the explanation assumes that 25 minutes after the search condition data and transmission request were initially (that is to say, the time before the previous time) transmitted to the transmission device 300, the terminal device 110 transmits the same search condition data and transmission request as the time before the previous time to the transmission device 300.

When the LAN card 306 receives the search condition data and the transmission request from the terminal device 110, execution of the search result output process is started and the processes of step S01 and step S02 already explained are executed. Through this, one item of cache data stored two times ago is searched.

Following this, the determination part 350 determines that the cache data can be searched (step S03; Yes), and executes the validity determination process shown in FIG. 9 (step S04).

When execution of the validity determination process begins, the period changing part 351 of the determination part 350 executes the processes from step S11 through step S15.

The terminal device 120 transmitted the transmission request and the same search condition data as this search condition data to the transmission device 300 25 minutes after the search condition data and the transmission request were initially transmitted to the transmission device 300. Consequently, the elapsed time is about 25 minutes.

Consequently, the actual determination part 352 determines that the elapsed time of about 25 minutes is longer than the valid time of 15 minutes for the cache data (step S15; No), and thus determines that the cache data is invalid (step S17).

By executing step S04 of FIG. 6, the determination part 350 determined that the cache data was invalid (step S05; Yes). Consequently, after the processes of step S06 through step S08 have been executed, the data output part 360 outputs search result data newly acquired in step S07 to the LAN card 306 with the terminal device 110 specified as the destination (step S09). Following this, execution of the search result output process is concluded. Consequently, the accuracy of search result data transmitted to the terminal device 120 improves.

Next, the explanation assumes that the terminal device 110 has transmitted search condition data indicating the new search condition of "departure from Haneda, arrival at Hiroshima, with a departure date of Mar. 31, 2013" and a transmission request.

When the LAN card 306 receives the new search condition data and transmission request, execution of the search result output process shown in FIG. 6 begins.

First, after the process in step S01 is executed, the searching part 340 searches for cache data from the cache table stored in the information memory 390, based on the search conditions indicated by the new search condition data (step S02). At this time, cache data matching the new search conditions is not stored in the cache table.

Following this, the processes of step S03 through step S06 are executed and new search condition data is transmitted to the transaction server 200.

Below, the explanation assumes that the transaction server 200 searches for one airline flight matching the search conditions of "departure from Haneda, arrival at Hiroshima, with a departure date of Mar. 31, 2013" indicated by the search condition data received, and that there are 12 empty seats on the searched airline flight.

The data acquisition part 315 acquires the search result data the LAN card 306 received from the transaction server 200 (step S07), and the saving part 320 saves the search result data in the cache table of FIG. 8 as cache data, associating therewith information indicating the saving date and time (step S08).

Following this, the data output part 360 outputs the stored cache data to the LAN card 306 with the terminal device 110 as the destination (step S09), and execution of the search result output process concludes.

Next, the explanation assumes that 35 minutes after the terminal device 110 has transmitted the new search condition data and transmission request to the transmission device 300, the same transmission request and search condition data as the new search condition data transmitted the previous time is transmitted by the terminal device 120 to the transmission device 300.

When the LAN card 306 receives the search condition data and transmission request from the terminal device 120, the search result output process is executed.

First, the process of step S01 already explained is executed, and the searching part 340 searches one item of cache data stored the previous time from the cache table (step S02). This cache data indicates that the number of empty seats is 12.

Following this, the determination part 350 executes the process of step S03 and then executes the validity determination process shown in FIG. 9 (step S04).

When execution of the validity determination process begins, the period changing part 351 of the determination part 350 executes the process of step S11 and then determines that the 12 empty seats indicated by the cache data is larger than 0 but is not less than or equal to the first threshold value (step S12; No). In this preferred embodiment, the explanation assumes that the first threshold value is 6 seats.

Next, the period changing part 351 determines whether or not the number of empty seats indicated by the cache data is 0, or is equal to or larger than a second threshold value (step S12).

Here, the second threshold value is a number of seats projected to be reserved from when the cache data was saved until an extended valid period has elapsed. The extended valid period is the set valid period extended by a predetermined extension time.

In this preferred embodiment, the explanation assumes that the extension time is set to 15 minutes, and that the extended valid period is 45 minutes, being the valid period of 30 minutes extended by the extension time of 15 minutes. However, this is intended to be illustrative and not limiting, for a person skilled in the art can determine an appropriate value for the extension time through experimentation.

In addition, in this preferred embodiment, the explanation assumes that the second threshold value is 12 seats. However, this is intended to be illustrative and not limiting. A person skilled in the art can determine a suitable value of the first threshold value through experimentation and/or the like. For example, it would be fine to calculate the average value of the decline in the number of empty seats per unit time with the above-described method, and to set as the second threshold value a value found by multiplying the calculated average value by the extended valid time.

At this time, the number of empty seats indicated by the cache data is 12 seats, so the period changing part 351 determines that the number of empty seats indicated by the cache data is not 0 seats but is at least as large as the second threshold value (step S18; Yes).

Next, the period changing part 351 reads information indicating the extension time stored in advance in the information memory 390. Next, the period changing part 351 sets the extended valid period as the valid period of the cache data lengthened by the extension time (step S19).

Here, 35 minutes after the terminal device 110 transmitted the new transmission condition data and transmission request to the transmission device 300, the terminal device 120 transmitted the same search condition data and transmission request to the transmission device 300. Consequently, the elapsed time is about 35 minutes.

The actual determination part 352 determines that the elapsed time of about 35 minutes is shorter than the valid period of 45 minutes for the cache data (step S15; Yes), and determines that the cache data is valid (step S16).

Through execution of step S04, the determination part 350 determines that the cache data is not invalid (that is to say, is valid) (step S05; No), so the communication processes from step S06 through step S08 are not executed. After determination by the determination part 350, the data output part 360 immediately outputs to the LAN card 306 the cache data searched in step S02, specifying the terminal device 120 as the destination (step S09). Following this, execution of the search result output process is concluded.

Consequently, the time during which the querying screen shown in FIG. 3 is displayed on the terminal device 120 is shortened, and it is possible to cause search results with high accuracy to be displayed on the search result screen shown in FIG. 4.

When the cache data searched in step S02 of FIG. 6 indicates 0 empty seats, the period changing part 351 determines that the conditions of step S18 of FIG. 9 are satisfied and in step S19 sets the valid period for the cache data to the extended valid period. This is because after the number of empty seats becomes 0, the number of empty seats does not change unless an event with an extremely low probability of occurring during the set valid period occurs, such as cancellation of a reservation or the start of reservations on a different airline flight.

In addition, when the number of empty seats indicated by the cache data searched in step S02 of FIG. 6 is larger than the first threshold value and smaller than the second threshold value, the period changing part 351 determines that the conditions of step S18 of FIG. 9 are not satisfied (step S18; No), and leaves the valid period of the cache data unchanged as the set valid period. This is because there is no need to adjust the set valid period.

The data cache system 1 according to the preferred embodiment was explained as exhibiting the volume of transactionable services, but this is intended to be illustrative and not limiting. It would also be fine for the data cache system 1 to exhibit the volume of transactionable products.

Here, the term products means items for the purpose of commercial transactions. In this preferred embodiment, the explanation is such that products are not limited to personal property but also include real estate.

In this preferred embodiment, the explanation was such that the transaction server 200, upon receiving the search condition data, returns search result data indicating the transactionable volume of services searched based on the search conditions indicated by the search condition data. In addition, in this preferred embodiment the explanation was such that search conditions used in searching airline flights include those containing conditions specifying a specific day for the departure date of the aircraft. However, this is intended to be illustrative and not limiting, for the transaction server 200, upon receiving the search condition data, may also return search result data indicating the transactionable volume of products searched based on the search conditions indicated by the search condition data. In addition, the search conditions may include conditions including one or more specified dates out of the projected sales date of a product, the projected shipping date, and the projected arrival date.

In addition, in this preferred embodiment, the explanation was such that transactions of reserving the providing of services was cited as one example of transactions. However, this is intended to be illustrative and not limiting, for transactions of buying and selling products and transactions of reserving sales or purchases of products could be cited as examples of transactions.

In this preferred embodiment, the explanation was such that the data acquisition part 315 acquires the search result data and the saving part 320 saves the search result data as cache data in the cache table shown in FIG. 8, associated with information indicating the saving date and time of the cache data. In addition, the explanation was such that the determination part 350 determines whether or not the cache data is valid, based on the elapsed time from the saving time of the cache data stored in the cache table, and the number of empty seats indicated by the cache data.

However, this is intended to be illustrative and not limiting, for it is possible to utilize the following composition for the data acquisition part 315, the saving part 320 and the determination part 350. The data acquisition part 315 can have a composition such that when the data acquisition part 315 acquires the search result data, the data acquisition part 315 acquires the current date and time from the OS and sets the acquired date and time as the acquisition date and time of the search result data. The saving part 320 can have a composition such that the saving part 320 saves the search result data as cache data in the cache table, associated with information indicating the acquisition date and time of the search result data. The determination part 350 can have a composition such that the determination part 350 makes the determination of whether or not the cache data is valid based on the elapsed time from the acquisition time of the search result data stored as cache data stored in the cache table, and the number of empty seats indicated by the cache data.

With this kind of composition, when it is determined that the cache data is invalid based on the elapsed time from the time when the cache data was acquired or saved and the volume indicated by the cache data, new search result data transmitted from the transaction server 200 is stored in the information memory 390 as new cache data. Consequently, it is possible to improve the accuracy of cache data while controlling increases in communication volume.

With this kind of composition, when it is determined that the cache data is valid, the cache data that has been determined to be valid is output, and when it is determined that the cache data is invalid, new cache data is output. Consequently, when it is determined that the cache data is valid, the cache data already stored in memory is immediately output without acquiring search result data from the transaction server 200. Consequently, it is possible to transmit data with higher accuracy than before while not just controlling increases in communication volume but also controlling increases in the time needed for transmission of data.

Second Preferred Embodiment

In this preferred embodiment, the valid period of cache data searched based on search conditions indicated by search condition data is shortened or extended based on one or more out of the search date indicated by the search condition data and the length of the period up to the search date.

The data cache system 1 and transmission device 300 according to this preferred embodiment possess the same composition, operate the same and possess the same functions as the data cache system 1 and the transmission device 300 described in the first preferred embodiment. Consequently, below the differences between the data cache system 1 and transmission device 300 according to this preferred embodiment and the data cache system 1 and transmission device 300 described in the first preferred embodiment are described.

The transmission device 300 according to this preferred embodiment stores a busy period table such as that shown in FIG. 10. Multiple items of data in which information indicating titles of busy periods that are periods when there are large numbers of travelers (hereafter called busy period names), information indicating start dates of busy periods, and information indicating end dates of busy periods are associated with each other are stored in advance in the busy period table.

The transmission device 300 according to this preferred embodiment executes the search result output process shown in FIG. 6 the same as the transmission device 300 according to the first preferred embodiment. However, in step S04 of the search result output process, the transmission device 300 according to this preferred embodiment executes substantially the same process as the determination process shown in FIG. 9, using the busy period table shown in FIG. 10.

The transmission device 300 according to the first preferred embodiment executes the determination process shown in FIG. 9 without using the busy period table. Consequently, below the explanation is primarily for differences between the determination process according to the first preferred embodiment and the determination process according to this preferred embodiment.

When it is determined in step S12 and step S13 of the determination process shown in FIG. 9 that the number of empty seats indicated by the cache data is larger than the first threshold value and smaller than the second threshold value (step S18; No), the period changing part 351 of the transmission device 300 according to the first preferred embodiment executes the processes starting from step S14 without changing the valid period of the cache data, which is the set valid period.

In contrast, when it is determined that the number of empty seats indicated by the cache data is larger than the first threshold value and smaller than the second threshold value (step S18; No), the period changing part 351 of the transmission device 300 according to this preferred embodiment executes the process of step S21 shown in FIG. 11.

In step S21, the period changing part 351 acquires the search date included in the search conditions indicated by the search condition data, from the search condition data acquired in step S02. Next, the period changing part 351 searches for busy periods that include the search date (step S21). The process of step S21 is a process in which, for example, the period changing part 351 searches for information indicating busy period names to which information indicating start dates prior to the search date and information indicating end dates after the search date are associated, from the busy period table shown in FIG. 10.

Next, the period changing part 351 determines whether or not the search date is a busy period, based on whether or not a busy period was searched in step S21 (step S22). Consequently, when a busy period was searched, the period changing part 351 determines that the search date is a busy period, and when a busy period was not searched, the period changing part 351 determines that the search date is not a busy period.

When the period changing part 351 determines in step S22 that the search date is a busy period (step S22; Yes), the valid period of the cache data is set to a shortened valid period (step S23). This is because during busy periods, the reservation volume per unit time is higher than during periods that are not busy periods.

When the period changing part 351 determines in step S22 that the search date is not a busy period (step S22; No), the current date and time are acquired from the OS and the remaining number of days from the current date and time to the search date is calculated (step S24).

Following this, the period changing part 351 reads information indicating the set date and time from the information memory 390. Next, a determination is made as to whether or not the remaining number of days is no larger than the set number of days indicated by the information that was read (step S25).

Typically, the airline flight reservation volume per unit time for example increases as the search date such as departure date approaches. Consequently, the set number of days is set so that the difference between the airline flight reservation volume per unit time when the number of days remaining is not larger than the set number of days and the airline flight reservation volume per unit time when the number of days remaining is larger than the set number of days becomes at least a prescribed value.

In this preferred embodiment, the explanation assumes that the set number of days is set so that the airline flight reservation volume per unit time when the number of days remaining is not larger than the set number of days is double the airline flight reservation volume per unit time when the number of days remaining is larger than the set number of days. However, this is intended to be illustrative and not limiting, for a person skilled in the art can determine a suitable set number of days through experimentation.

When the determination in step S25 is that the number of days remaining is not larger than the set number of days (step S25; Yes), the period changing part 351 sets the valid period of the cache data to the shortened valid period (step S23).

In contrast, when the determination is that the number of days remaining is larger than the set number of days (step S25; No), the period changing part 351 sets the valid period of the cache data to the extended valid period (step S26).

After step S23 or step S26 has been executed, step S14 of FIG. 9 and subsequent steps are executed and execution of the determination process then concludes.

Figure 11:
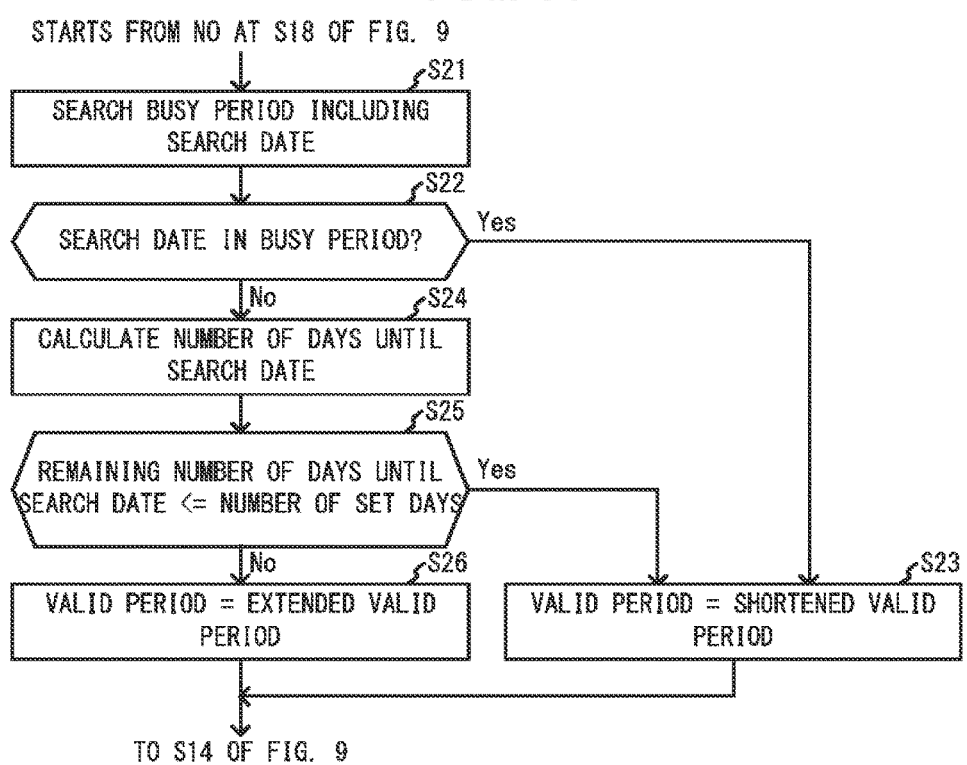
FIG. 11 is a flowchart showing part of a determination process executed by the transmission device according to the second preferred embodiment.

By omitting execution of step S21 and step S22 shown in FIG. 11, the valid period of the cache data may be lengthened or shortened based on the length of the period until the search date and not based on the search date.

In addition, by omitting execution of step S24 and step S25 shown in FIG. 11, the valid period of the cache data may be lengthened or shortened based on the search date and not based on the length of the period until the search date.

In this preferred embodiment, the explanation was such that the search conditions used in searching for airline flights included conditions designating a specific day for the departure date of the aircraft. However, this is intended to be illustrative and not limiting, for it would be fine for the search conditions to include conditions designating as the specific date one or more out of the projected sales date, projected shipping date or projected arrival date of a product.

The transaction volume of a service or product often changes with a dependence on a date designated as a search date, for example the date a service is provided, or the projected sales date, projected shipping date or projected arrival date of a product. In addition, the transaction volume of a service or product often changes with a dependence on the number of days remaining until the day designated as the search date. Consequently, with this kind of composition, the valid period of the cache data is shortened or lengthened based on one or more out of the search date indicated by the search condition data or the length of the period until the search date, so it is possible to determine with good accuracy whether or not the cache data is valid.

Third Preferred Embodiment

In this preferred embodiment, the first threshold value and second threshold value used to lengthen or shorten the valid period of the cache data are changed so that the difference between the number of empty seats indicated by cache data transmitted prior to an airline flight reservation being submitted and the number of empty seats indicated by search result data acquired after submission shrinks.

The data cache system 1 and transmission device 300 according to this preferred embodiment have the same composition, operate similarly and possess the same functions as the data cache system 1 and transmission device 300 explained in the first preferred embodiment. Consequently, below the differences between the data cache system 1 and transmission device 300 according to this preferred embodiment and the data cache system 1 and transmission device 300 explained in the first preferred embodiment are explained.

Below, the explanation assumes that the terminal device 110 has transmitted to the transmission device 300 search condition data indicating search conditions for airline flights, and a transmission request seeking for transmission of data indicating the number of empty seats on airline flights searched based on the search conditions, and/or the like.

The transmission device 300 executes the search result output process shown in FIG. 6 upon receiving search condition data and a transmission request. Through this, cache data indicating the number of empty seats on airline flights searched based on the search conditions indicated by the search condition data is transmitted by the transmission device 300 to the terminal device 110. At this time, the transmission device 300 saves the transmitted cache data and for example information identifying the transmission destination of the cache data such as an IP (Internet Protocol) address and/or the like, associated with each other in the information memory 390.

Next, the explanation assumes that the terminal device 120 has transmitted to the transmission device 300 the same search condition data as the search condition data transmitted by the terminal device 110, and a transmission request.

Following this, the terminal device 110 receives cache data indicating the number of empty seats and/or the like from the transmission device 300. This cache data is cache data that the transmission device 300 determined to be valid using the first threshold value and the second threshold value in the determination process shown in FIG. 9, or cache data acquired anew by the transmission device 300 from the transaction server 200 in place of cache data determined by the transmission device 300 to be invalid.

The terminal device 110 displays the search result display screen shown in FIG. 4 based on the cache data received. The terminal device 110 confirms the flight number, airline company and number of empty seats of the airline flight displayed on the search result display screen and determines whether or not to reserve the searched airline flight. When the user reserves the airline flight, the airline flight is reserved by operating the input part 111 shown in FIG. 1.

The terminal device 110 inputs a user ID identifying the user and a flight number identifying the airline flight to be reserved, in accordance with operation of the input part 111. Following this, the terminal device 110 transmits to the transmission device 300 submission data indicating submission of a reservation for the airline flight identified by the flight number, including this flight number and user ID.

Figure 12:
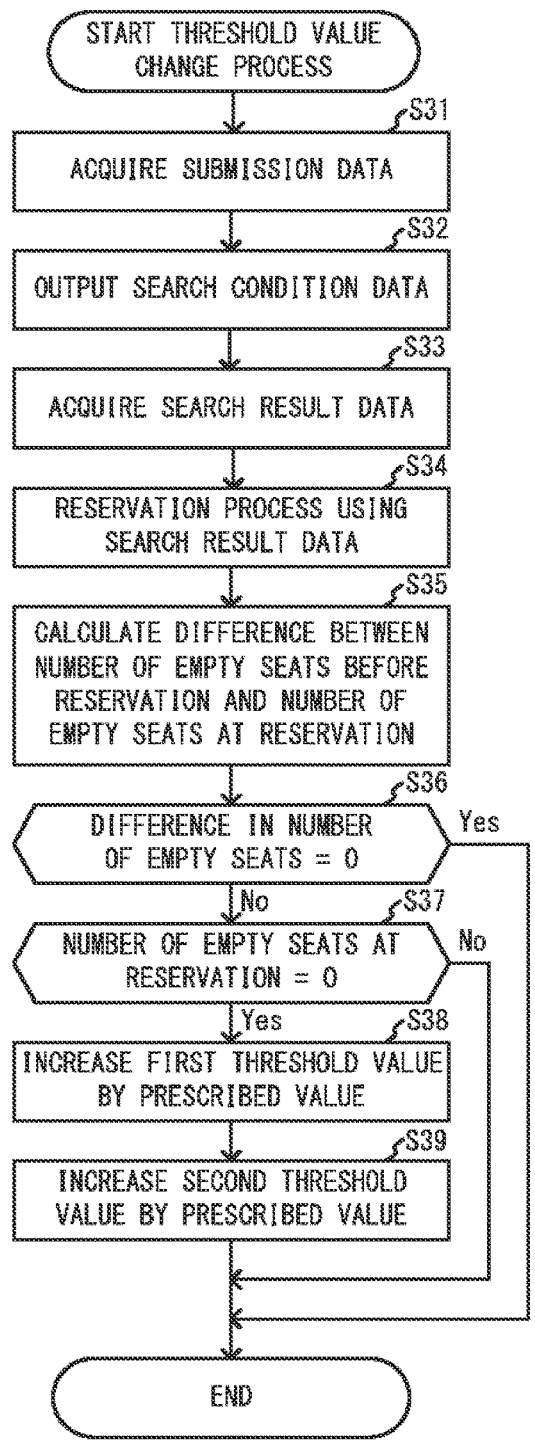
FIG. 12 is a flowchart showing one example of a threshold value change process executed by the transmission device according to a third preferred embodiment.

The LAN card 306 of the transmission device 300 shown in FIG. 5 receives the submission data from the terminal device 110. When the LAN card 306 receives the submission data, the CPU 301 of the transmission device 300 shown in FIG. 5 executes a threshold value change process for changing the first threshold value and the second threshold value as shown in FIG. 12.

Figure 13:
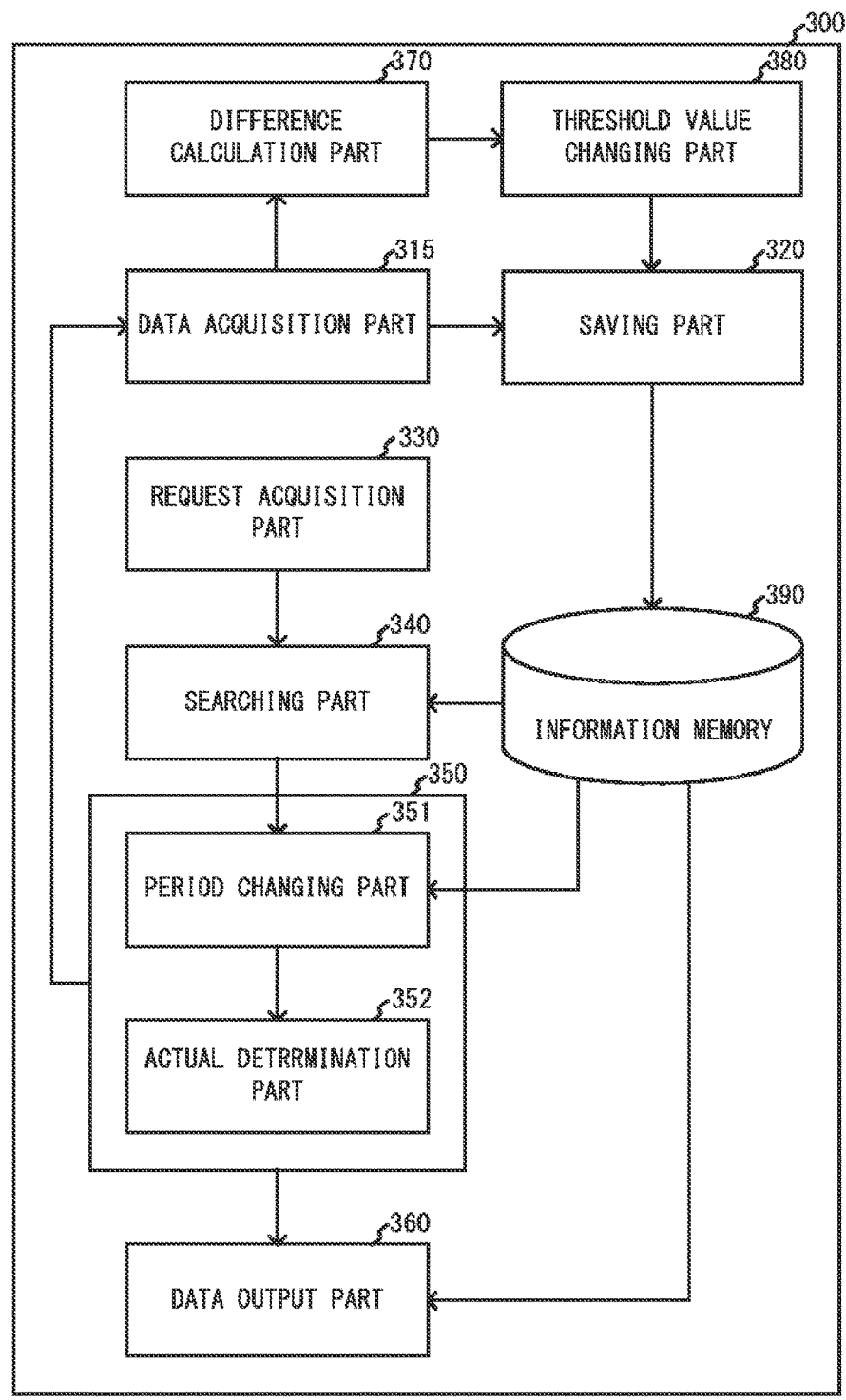
FIG. 13 is a function block diagram showing one example of functions possessed by the transmission device according to a third preferred embodiment.

Through this, the CPU 301 functions as a difference calculation part 370 and threshold value changing part 380 shown in FIG. 13.

The difference calculation part 370 calculates the difference between the number of empty seats indicated by cache data transmitted prior to acquisition of the submission data and the number of empty seats indicated by new search result data acquired after acquisition of the submission data, regarding the airline flight for which a reservation was submitted.

The threshold value changing part 380 changes the first threshold value and the second threshold value so that the difference calculated by the difference calculation part 370 shrinks.

When execution of the threshold value change process shown in FIG. 12 begins, the data acquisition part 315 acquires the submission data transmitted by the terminal device 110, from the LAN card 306 shown in FIG. 5 (step S31).

Next, the data output part 360 outputs search conditions for searching the airline flight identified by the flight number contained in the submission data to the LAN card 306 with the transaction server 200 as the destination (step S32). Following this, the LAN card 306 transmits the output search conditions to the transaction server 200.

Following this, the LAN card 306 receives the search result data from the transaction server 200. The data acquisition part 315 acquires the search result data from the LAN card 306 (step S33).

Next, the data output part 360 executes a reservation process using the acquired search result data (step S34).

In the reservation process, the data output part 360 determines whether or not the number of empty seats indicated by the search result data is larger than 0. At this time, when the determination is that the number of empty seats is 0, the data output part 360 generates an error message indicating that empty seats disappeared prior to the reservation being received, and outputs the generated error message to the LAN card 306. The terminal device 110, upon receiving the error message from the LAN card 306, displays the message received on the display part 119 shown in FIG. 1.

In contrast, when the determination is that the number of empty seats is larger than 0 (that is to say, when there are empty seats), the data output part 360 outputs submission data to the LAN card 306 with the transaction server 200 as the destination.

The transaction server 200, upon receiving the submission data from the transmission device 300, receives reservations for the airline flight through the submission data. Following this, the transaction server 200 returns to the transmission device 300 a message indicating that the reservation was received (hereafter called a reservation receipt message).

The transmission device 300, upon receiving the reservation receipt message, transfers the reservation receipt message to the terminal device 110. Following this, upon receiving the reservation receipt message, the terminal device 110 displays the message received on the display part 119 shown in FIG. 1.

When the reservation process of step S34 concludes, the difference calculation part 370 searches the cache data sent to the terminal device 110 from the information memory 390 based on the IP address of the terminal device 110.

Next, the difference calculation part 370 calculates the difference between the number of empty seats indicated by the search result data acquired in step S33 (that is to say, the number of empty seats at the time of reservation) and the number of empty seats indicated by the cache data transmitted to the terminal device 110 (that is to say, the number of empty seats prior to reservation) (step S36).

Following this, the threshold value changing part 380 determines whether or not the calculated difference is 0 (step S36). When the determination at this time is that the difference is 0 (step S36; Yes), the threshold value changing part 380 concludes execution of the threshold value change process without changing the first threshold value or the second threshold value.

In contrast, when the determination is that the difference is not 0 (step S36; No), the threshold value changing part 380 determines whether or not the number of empty seats at the time of reservation is 0 (that is to say, that a reservation could not be made) (step S37).

When the determination at this time is that the number of empty seats at the time of reservation is not 0 (that is to say, that the reservation could be made) (step S37; No), the threshold value changing part 380 concludes execution of the threshold value change process without changing the first threshold value or the second threshold value.

In contrast, when the determination is that the number of empty seats at the time of reservation is 0 (that is to say, the reservation could not be made) (step S37; Yes), the threshold value changing part 380 increases the first threshold value and the second threshold value by a prescribed value (step S38 and step S39). Following this, execution of the threshold value change process concludes.

Following this, the next time the validity determination process shown in FIG. 9 is executed, the saving part 320 updates the information indicating the first threshold value and the second threshold value read from the information memory 390 with information indicating the changed first threshold value and information indicating the changed second threshold value. The information indicating the prescribed value used to change the first threshold value and the second threshold value is stored in advance in the information memory 390. A person skilled in the art can determine a more suitable prescribed value through experimentation.

The first threshold value is used in step S12 of FIG. 9, and in step S12, when the number of empty seats indicated by the cache data is not larger than the first threshold value, the valid period of the cache data is shortened. Consequently, if the first threshold value is increased by a prescribed value, the valid period of more cache data is shortened compared to before the increase, so the accuracy of more cache data is improved. As a result, the average value of the difference between the number of empty seats prior to reservation and the number of empty seats at the time of reservation shrinks.

The second threshold value is used in step S18 of FIG. 9, and in step S18, when the number of empty seats indicated by the cache data is at least as large as the second threshold value, the valid period of the cache data is extended. Consequently, by increasing the second threshold value by a prescribed value, there is less cache data for which the valid period is extended more than before the increase, so the accuracy of more cache data is improved. As a result, the average value of the difference between the number of empty seats prior to reservation and the number of empty seats at the time of reservation shrinks.

In this preferred embodiment, the explanation was such that by increasing the first threshold value and the second threshold value by a prescribed value in step S38 and step S39, the difference between the number of empty seats at the time of reservation and the number of empty seats prior to reservation shrinks. However, this is intended to be illustrative and not limiting, for it would be fine to lengthen the shortened time of the valid period by a prescribed value and shorten the extended time by a prescribed value, in step S38 and step S39. A person skilled in the art can determine a more suitable value for the prescribed time through experimentation.

Fourth Preferred Embodiment

In the first preferred embodiment, the explanation assumed that the transaction server 200 searched for only one airline flight based on the search conditions "departure from Haneda, arrival at Sapporo, with a departure date of Mar. 1, 2013". In this preferred embodiment, the explanation will assume that the transaction server 200 searches for multiple airline flights based on the above-described search conditions.

In addition, with this preferred embodiment, the explanation assumes that even when the number of empty seats on the searched airline flight is 9 or larger, the transaction server 200 receives search result data that the number of empty seats is 9. Consequently, the explanation assumes that when the searched airline flight is on a large passenger plane, when the search result data indicates that the number of empty seats is 9, it is impossible to distinguish whether the actual number of empty seats is just 9 or is several hundred.

The data cache system 1 and the transmission device 300 according to this preferred embodiment have the same composition, operate similarly and possess the same functions as the data cache system 1 and the transmission device 300 described in the first preferred embodiment. Consequently, below the differences between the data cache system 1 and transmission device 300 according to this preferred embodiment and the data cache system 1 and transmission device 300 explained with the first preferred embodiment are described.

First, the explanation takes as an example a case in which the transmission device 300 has received a transmission request and search condition data indicating the search conditions "departure from Haneda, arrival at Sapporo, with a departure date of Mar. 1, 2013." It is the terminal device 110 that has transmitted this search condition data and transmission request to the transmission device 300, and when the transmission device 300 received this search condition data and transmission request, no data was stored in the cache table shown in FIG. 8.

Figure 14:
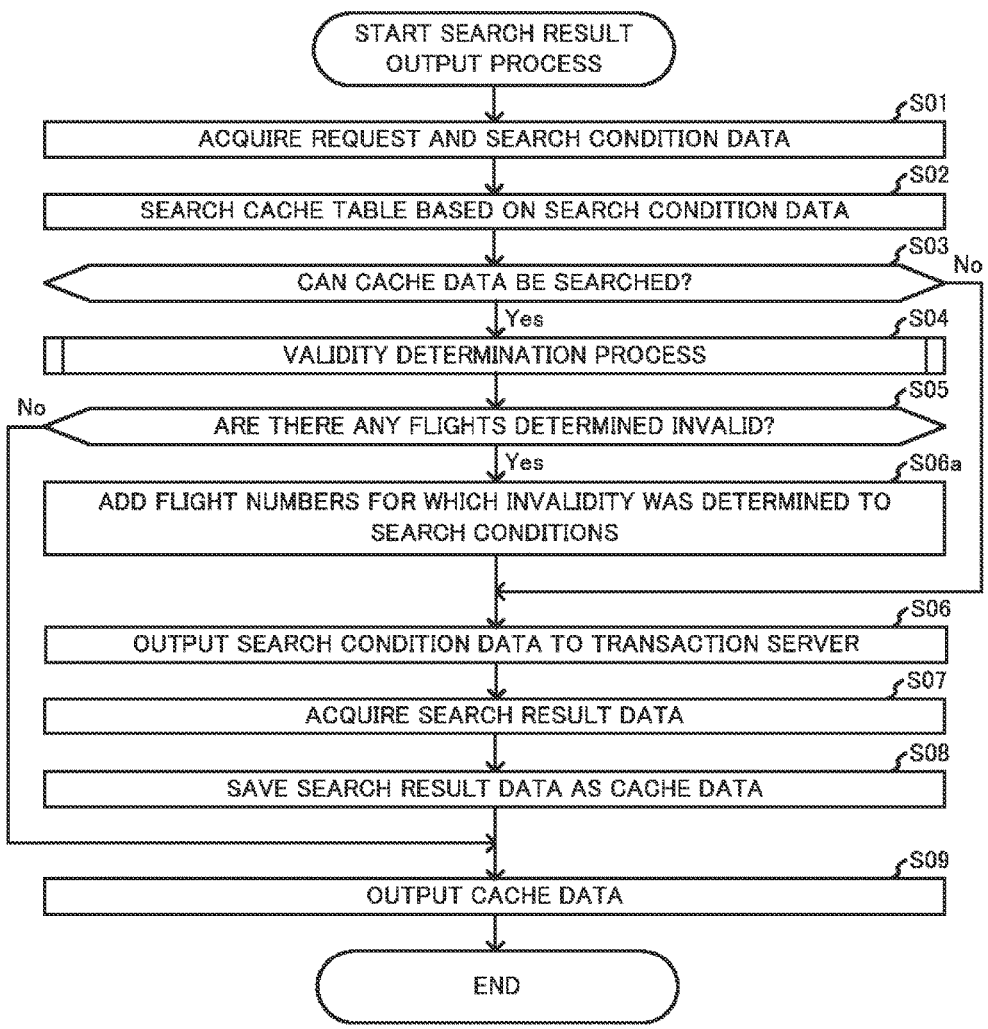
FIG. 14 is a flowchart showing one example of a search result output process executed by the transmission device according to a fourth preferred embodiment.

The transmission device 300 according to this preferred embodiment executes a search result output process shown in FIG. 14 when the LAN card 306 of FIG. 5 receives the search condition data and the transmission request.

When execution of the search result output process begins, the processes from step S01 to step S03 of FIG. 6 are executed. Because no data is stored in the cache table, the determination part 350 determines that the cache data cannot be searched (step S03; No).

Next, after the processes from step S06 through step S09 shown in FIG. 6 have been executed, execution of the search result output process is concluded. Through this, search result data such as that shown in FIG. 15 is stored in the cache table as the cache data. The stored cache data is four items of data searched based on the search conditions "departure from Haneda, arrival at Sapporo, with a departure date of Mar. 1, 2013." The four items of cache data indicate the number of empty seats on airline flights respectively identified by the flight numbers ABC123, DEF123, GHI123 and JKL123. The number of empty seats on the airline flights identified by the flight numbers ABC123 and GHI123 is at least 9, the number of empty seats on the airline flight identified by the flight number DEF123 is 3 and the number of empty seats on the airline flight identified by the flight number JKL123 is 0.

Next, the explanation assumes that 20 minutes after the terminal device 110 has transmitted the search condition data and transmission request to the transmission device 300, the terminal device 120 transmits to the transmission device 300 a transmission request and search condition data that is the same as the search condition data transmitted by the terminal device 110.

When the LAN card 306 receives the search condition data and transmission request from the terminal device 120, the search result output process of FIG. 14 is again executed.

First, the processes of step S01 and step S02 that have already been described are executed. Through this, the searching part 340 searches four items of cache data from the cache table shown in FIG. 15, based on the search conditions "departure from Haneda, arrival at Sapporo, with a departure date of Mar. 1, 2013."

Figure 16:
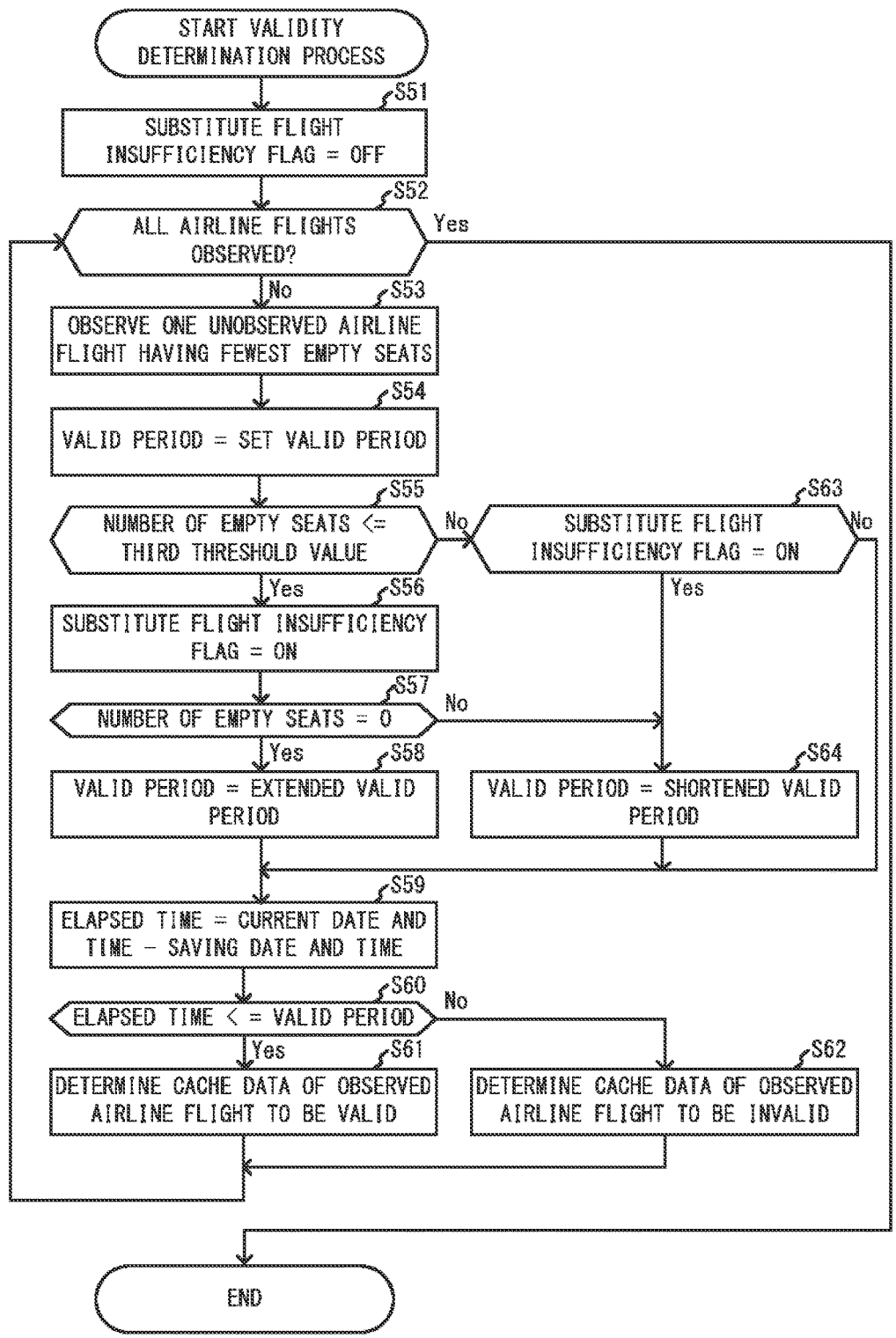
FIG. 16 is a flowchart showing one example of a determination process executed by the transmission device according to the fourth preferred embodiment.

Following this, when it is determined that the cache data can be searched (step S03; Yes), the determination part 350 executes a determination process shown in FIG. 16 for each of the searched four items of cache data (step S04).

When execution of the validity determination process begins, the determination part 350 initializes a substitute flight insufficiency flag, indicating whether or not substitute flights are insufficient, to OFF (step S51).

Next, the determination part 350 determines whether or not all airline flights searched in step S02 of FIG. 14 have been observed (step S52). At this time, execution of the validity determination process has only just begun, so not all airline flights have been observed. Consequently, the determination part 350 determines that all airline flights have not been observed (step S52; No).

Next, the determination part 350 observes the airline flight having the fewest number of empty seats, from among the unobserved airline flights (step S53). Because the number of empty seats on the airline flight identified by the flight number JKL123 is 0, this airline flight (below called airline flight JKL123) is observed.

Following this, the period changing part 351 of the determination part 350 sets the valid period of the cache data of the observed airline flight JKL123 (hereafter called the observed cache data) to the set valid period of 30 minutes (step S54).

Next, the period changing part 351 reads information indicating a third threshold value from the information memory 390. Before explaining about the third threshold value, the relationship among the multiple airline flights searched with the same search conditions is described. Multiple airline flights searched with the same search conditions mutually have a substitute flight relationship. When empty seats on a given flight mutually having a substitute flight relationship are lacking, reservations on airline flights on which empty seats are not lacking increase. In addition, the difference in declines per unit time in the number of empty seats among airline flights mutually having a substitute flight relationship is smaller than difference in declines among these airline flights and airline flights not having a substitute flight relationship. Consequently, when empty seats on a given airline flight are insufficient, there is a high probability that empty seats on substitute flights have begun to be insufficient.

Insufficient empty seats means that the number of empty seats has fallen below a prescribed number of empty seats. Consequently, the third threshold value is a value found by adding to the above-described prescribed number of seats the number of seats projected to be reserved by the time the set valid period has elapsed from when the cache data was saved. In this preferred embodiment, the third threshold value is explained as being 8 seats, but this is intended to be illustrative and not limiting. A person skilled in the art can determine a more suitable third threshold value through experimentation.

The period changing part 351 determines that the number of empty seats indicated by the observed cache data, which is 0, is less than the 8 seats that is the third threshold value (step S55; Yes), and turns the substitute flight insufficiency flag to ON (step S56).

Next, the period change 351 determines that the number of empty seats on the airline flight indicated by the observed cache data is 0 (step S57; Yes), and sets the valid period to the extended valid period (step S58). That is because when the number of empty seats is 0, the number of empty seats will not change unless cancellations of reservations and/or the like occur.

Following this, the actual determination part 352 of the determination part 350 calculates the elapsed time from the saving date and time of the observed cache data (step S59). Here, 25 minutes after the terminal device 110 transmitted the search condition data and the transmission request to the transmission device 300, the terminal device 120 transmitted the same search condition data as the search condition data transmitted by the terminal device 110, and a transmission request, to the transmission device 300. Consequently, the elapsed time is about 25 minutes.

Following this, the actual determination part 352 determines that the elapsed time length is equal to or shorter than the valid period length of the observed cache data (step S60;

Yes). This is because the elapsed time is 25 minutes and the valid period of the observed cache data is the extended valid period of 45 minutes.

Consequently, the actual determination part 352 determines that the cache data of the observed airline flight JKL123 is valid (step S61).

Next, the determination part 350 returns to step S52 and because the remaining three items of cache data have not yet been observed, determines that all airline flights have not been observed (step S52; No).

Next, the determination part 350 observes the airline flight DEF123 having the fewest number of empty seats, out of the unobserved airline flights ABC123, DEF123 and GHI123 (step S53).

Following this, the processes from step S54 through step S56 are executed. Next, the period changing part 351 determines that the number of empty seats on the airline flight indicated by the cache data of the observed airline flight DEF123 is 3 and is not 0 (step S57; No), and sets the valid period to the shortened valid period of 15 minutes (step S64). This is because the number of empty seats on the observed airline flight DEF123 is insufficient.

Following this, after the process of step S59 is executed, the actual determination part 352 determines that the elapsed time length is longer than the valid period length of the observed cache data (step S60; No). This is because the elapsed time is 25 minutes, whereas the valid period for the observed cache data is the shortened valid period of 15 minutes.

Consequently, the actual determination part 352 determines that the cache data of the observed airline flight DEF123 is invalid (step S62).

Next, the determination part 350 returns to step S52 and because the remaining two items of cache data have not yet been observed, determines that all airline flights have not been observed (step S52; No).

Next, the determination part 350 observes the airline flight ABC123 having at least 9 empty seats, out of the unobserved airline flights ABC123 and GHI123 (step S53).

Following this, the process of step S54 is executed, and the period changing part 351 determines that the 9 or more that is the number of empty seats indicated by the observed cache data is not the 8 seats of the third threshold value (is more than 8 seats) (step S55; No).

Next, the period changing part 351 determines that the substitute flight insufficiency flag is ON (step S63; Yes), and determines that the number of empty seats on substitute flights to the observed airline flight ABC123 is insufficient. Consequently, the period changing part 351 determines that reservations on the observed airline flight ABC123 have increased and sets the valid period of the cache data of the airline flight ABC123 to the shortened valid period (step S64). When it is determined in step S63 that the substitute flight insufficiency flag is not ON (in other words, is OFF) (step S63; No), the period changing part 351 executes the processes beginning with step S59 without changing the valid period of the observed cache data.

Following this, after the process of step S59 has been executed, the actual determination part 352 determines that the elapsed time length is longer than the valid period length of the observed cache data (step S60; No). This is because the elapsed time is 25 minutes and the valid period of the observed cache data is the shortened valid period of 15 minutes.

Consequently, the actual determination part 352 determines that the cache data of the observed flight ABC123 is invalid (step S62).

Next, the determination part 350 returns to step S52 and because the remaining one item of cache data has not yet been observed, determines that all airline flights have not been observed (step S52; No).

Next, the determination part 350 observes the unobserved airline flight GHI123 (step S53). Following this, the processes from step S54 through step S60 are executed, and it is determined that the cache data of the airline flight GHI123 indicating that the number of empty seats is at least 9 is invalid (step S62).

Next, the determination part 350 returns to step S52, determines that all airline flights have been observed (step S52; Yes), and concludes execution of the determination process.

By executing step S04 of FIG. 14, the determination part 350 determines that cache data determined to be invalid exists (step S05; Yes). This is because in step S04, the cache data of airline flights ABC123, DEF123 and GHI123 was determined to be invalid.

Next, the data output part 360 adds the flight numbers of the airline flights ABC123, DEF123 and GHI123 to the search conditions indicated by the search condition data acquired in step S01 (step S06a). The search conditions to which the flight numbers have been added are now "departure from Haneda, arrival at Sapporo, with a departure date of Mar. 1, 2013, and flight number is ABC123, DEF123 or GHI123."

Following this, the data output part 360 outputs the search condition data indicating the search conditions to which the flight numbers have been added, to the LAN card 306 with the transaction server 200 as the destination (step S06).

The transaction server 200 searches the three airline flights based on the search conditions indicated by the search condition data received and returns three items of search result data respectively indicating the number of empty seats on the three airline flights searched.

When the LAN card 306 receives the three items of search result data from the transaction server 200, the data acquisition part 315 acquires the three items of search result data from the LAN card 306 (step S07).

Next, the saving part 320 saves the three items of cache data and information indicating the saving date and time, associated with each other, in the cache table shown in FIG. 8 (step S08).

Following this, the data output part 360 outputs the three items of cache data saved in step S08 and the one item of cache data searched in step S02 and determined to be valid in step S04 to the LAN card 306 with the terminal device 110 as the destination (step S09). Following this, the LAN card 306 transmits the four items of cache data output to the terminal device 110, and the data output part 360 concludes execution of the search result output process.

When the determination part 350 determines in step S05 that cache data determined to be invalid does not exist among the multiple items of cache data searched in step S02 (step S05; No), the data output part 360 outputs all of the multiple items of cache data searched in step S02 to the LAN card 306 with the terminal device 110 as the destination (step S09). Following this, the data output part 360 concludes execution of the search result output process.

With this kind of composition, when any one or more of the volume of transactionable services respectively indicated by multiple items of cache data searched based on the same search conditions is not larger than the third threshold value, the valid period of cache data indicating a larger volume than the third threshold value is shortened. Here, multiple services searched with the same search conditions have a mutual substitute relationship. When there are services that are not transactionable except in volumes not larger than the third threshold value, the transaction volume of services in a substitute relationship increases. Consequently, because the valid period of the cache data is shortened even for cache data of transactionable services with larger volume than the third threshold value, the accuracy of the cache data increases.

It is possible to mutually combine the first through fourth preferred embodiments. It is possible to provide a transmission device 300 provided with a composition for realizing functions according to any of the first through fourth preferred embodiments, and it is also possible to supply a system comprising multiple devices and provided as an entire system with a composition for realizing functions according to any of the first through fourth preferred embodiments.

It is possible to supply a transmission device 300 provided in advance with a composition for realizing functions according to any of the first through fourth preferred embodiments, and it is also possible to cause an existing transmission device 300 to function as a transmission device 300 according to any of the first through fourth preferred embodiments by applying a program. In other words, by applying a program for causing the various functional compositions of the transmission device 300 illustrated in any of the first through fourth preferred embodiment to be realized so as to be executed by a computer (CPU and/or the like) controlling an existing transmission device, it is possible to cause the existing transmission device to function as the transmission device 300 according to any of the first through fourth preferred embodiments.

The distribution method of such a program is arbitrary, and it is possible to store and distribute the program on a memory medium such as a memory card, CD-ROM or DVD-ROM and/or the like, or to distribute the program via a communication media such as the Internet and/or the like. In addition, the method according to the present disclosure can be implemented using the transmission device 300 according to any of the first through fourth preferred embodiments.

Preferred embodiments of the present disclosure are described above in details. This disclosure is not confined to the above particular embodiments, and various modifications and applications are available without departing from the content of the present disclosure described in the scope of the claims.

It should be noted that the above embodiments are meant only to be illustrative of those embodiments and are not intended to be limiting the scope of the present disclosure. Accordingly, the scope of the present disclosure should not be determined by the embodiments illustrated, but by the appended claims. It is therefore the intention that the present disclosure be interpreted to include various modifications that are made within the scope of the claims and their equivalents.

REFERENCE SIGNS LIST

1 Data cache system
10 Communication network
110, 120 Terminal device
111, 121 Input part
119, 129 Display part
200 Transaction server
300 Transmission device
301 CPU
302 ROM
303 RAM
304 Hard disk
305 Media controller
306 LAN card
307 Video card
308 LCD
309 Keyboard
310 Speaker
311 Touchpad
315 Data acquisition part
320 Saving part
330 Request acquisition part
340 Searching part
350 Determination part
351 Period changing part
352 Actual determination part
360 Data output part
370 Difference calculation part
380 Threshold value changing part
390 Information memory

The invention claimed is:

1. A data cache system comprising:

at least one memory operable to store program code;

at least one processor operable to read the program code and operate as instructed by the program code, the program code comprising:

request receiving code configured to cause the at least one processor to receive a request for an output of a volume of products or services;

determining code configured to cause the at least one processor to determine whether cache data indicating the volume of the products or services is searched in a memory device;

acquiring code; storing code; and outputting code, wherein, upon a satisfaction of a condition (i) that it is determined by the determining code that the cache data indicating the volume of the products or services is not searched in the memory device, the acquiring code causes the at least one processor to acquire, from a server, the volume of the products or services;

the storing code causes the at least one processor to store the acquired volume in the memory device as the cache data; and the outputting code causes the at least one processor to output the volume stored as the cache data by the storing code;

volume acquiring code; threshold period determining code; and comparison code, wherein, upon a satisfaction of a condition (ii) that it is determined by the determining code that the cache data indicating the volume of the products or services is searched in the memory device, the volume acquiring code causes the at least one processor to acquire the volume indicated by the cache data;

the threshold period determining code causes the at least one processor to determine a threshold period, to which an elapsed time length from a time when the cache data is stored in the memory device is compared, based on the volume indicated by the cache data; and the comparison code causes the at least one processor to determine that the cache data is valid based on a result of comparison that the elapsed time length is not greater than the threshold period, and to determine that the cache data is invalid based on a result of comparison that the elapsed time length is greater than the threshold period, wherein, upon a satisfaction of the condition (ii) and a condition (iii) that it is determined that the cache data is valid, the outputting code further causes the at least one processor to output the volume indicated by the cache data, and wherein, upon a satisfaction of the condition (ii) and a condition (iv) that it is determined that the cache data is invalid, the acquiring code further causes the at least one processor to acquire, from the server, the volume of the products or services;

the storing code further causes the at least one processor to store the acquired volume in the memory device as the cache data; and the outputting code further causes the at least one processor to output the volume stored as the cache data by the storing code.

2. The data cache system according to claim 1, wherein the threshold period determining code further causes the at least one processor to, in response to the request, determine the threshold period by extending or shortening the threshold period based on the request and the volume indicated by the cache data.

3. The data cache system according to claim 2, wherein:
the acquiring code further causes the at least one processor to acquire a volume of products or services searched based on a search date and any one or more of a projected sales date, projected shipping date and projected arrival date of a product or a supply date of a service included in search condition; and
the threshold period determining code further causes the at least one processor to, in response to the request, determine the threshold period by extending or shortening the threshold period based on any one or more of the search date included in the search condition, and a length of a period until the search date.

4. The data cache system according to claim 1, wherein the threshold period determining code further causes the at least one processor to determine, in response to the request, the threshold period by shortening the threshold period when the volume indicated by the cache data is not larger than a predetermined first threshold value.

5. The data cache system according to claim 4, wherein the threshold period determining code further causes the at least one processor to, in response to the request, determine the threshold period by extending the threshold period when the volume indicated by the cache data is equal to or larger than a predetermined second threshold value which is larger than the predetermined first threshold value.

6. The data cache system according to claim 5, the program code further comprising post output acquisition code; calculation code; and threshold value changing code, wherein, upon the satisfaction of the condition (ii) that it is determined by the determining code that the cache data indicating the products or services is searched in the memory device:
the post output acquisition code causes the at least one processor to acquire from the server a volume of submitted products or services when submission data indicating a submission of a transaction of the products or services corresponding to the request is acquired after the volume is output in response to the request;
the calculation code causes the at least one processor to calculate a difference between the volume output prior to acquisition of the submission data and the volume acquired after the acquisition of the submission data, for a product or service for which there was a submission; and
the threshold value changing code causes the at least one processor to change any one or more of the predetermined first threshold value and the predetermined second threshold value so that the calculated difference decreases.

7. The data cache system according to claim 1, wherein the threshold period determining code further causes the at least one processor to, in response to the request, determine the threshold period by shortening the threshold period when the volume indicated by the cache data is smaller than or equal to a predetermined first threshold value and, in response to the request, determine the threshold period by extending the threshold period when the volume is equal to or larger than a predetermined second threshold value which is larger than the predetermined first threshold value,
the program code further comprising post output acquisition code; calculation code; and threshold value changing code, wherein, upon the satisfaction of the condition (ii) that it is determined by the determining code that the cache data indicating the products or services is searched in the memory device:
the post output acquisition code causes the at least one processor to acquire from the server a volume of submitted products or services when submission data indicating a submission of a transaction of the products or services corresponding to the request is acquired after the volume is output in response to the request;
the calculation code causes the at least one processor to calculate a difference between the volume output prior to acquisition of the submission data and the volume acquired after the acquisition of the submission data, for a product or service for which there was a submission; and
the threshold value changing code causes the at least one processor to change any one or more of the predetermined first threshold value and the predetermined second threshold value so that the calculated difference decreases.

8. The data cache system according to claim 2, wherein:
the request receiving code further causes the at least one processor to acquire search conditions used in searching products or services, and a request for an output of a volume of searched products or services;
the acquiring code, upon a satisfaction of a condition (v) that cache data indicating the volume of the searched products or services is not searched in the memory device, causes the at least one processor to acquire volumes from the server, for multiple products or services searched based on the search conditions; and
the threshold period determining code, upon a satisfaction of a condition (vi) that the cache data indicating the volume of the searched products or services is searched in the memory device, causes the at least one processor to determine the threshold period by shortening the threshold period in response to the cache data indicating a volume larger than a predetermined third threshold value, when any one or more of multiple volumes stored as the cache data is not larger than the predetermined third threshold value.

9. A computer-readable non-transitory recording medium on which is recorded a program causing a computer to perform:

receiving a request for an output of a volume of products or services;

determining whether cache data indicating the volume of the products or services is searched in a memory device;

upon a satisfaction of a condition (i) that it is determined that the cache data indicating the volume of the products or services is not searched in the memory device, acquiring, from a server, the volume of the products or services;

storing the acquired volume in the memory device as the cache data; and outputting the acquired volume stored as the cache data;

upon a satisfaction of a condition (ii) that it is determined that the cache data indicating the volume of the products or services is searched in the memory device, acquiring the volume indicated by the cache data;

determining a threshold period, to which an elapsed time length from a time when the cache data is stored in the memory device is compared, based on the volume indicated by the cache data; and determining that the cache data is valid based on a result of comparison that the elapsed time length is not greater than the threshold period, and determining that the cache data is invalid based on a result of comparison that the elapsed time length is greater than the threshold period, upon a satisfaction of the condition (ii) and a condition (iii) that it is determined that the cache data is valid, outputting the volume indicated by the cache data; and upon a satisfaction of the condition (ii) and a condition (iv) that it is determined that the cache data is invalid, acquiring, from the server, the volume of the products or services;

storing the acquired volume in the memory device as the cache data; and outputting the acquired volume stored as the cache data.

10. A method including:

receiving a request for an output of a volume of products or services;

determining whether cache data indicating the volume of the products or services is searched in a memory device;

upon a satisfaction of a condition (i) that it is determined that the cache data indicating the volume of the products or services is not searched in the memory device, acquiring, from a server, the volume of the products or services;

storing the acquired volume in the memory device as the cache data; and outputting the volume acquired from the server;

upon a satisfaction of a condition (ii) that it is determined that the cache data indicating the volume of the products or services is searched in the memory device, acquiring a volume indicated by the cache data;

determining a threshold period, to which an elapsed time length from a time when the cache data is stored in the memory device is compared, based on the volume indicated by the cache data; and determining that the cache data is valid based on a result of comparison that the elapsed time length is not greater than the threshold period, and determining that the cache data is invalid based on a result of comparison that the elapsed time length is greater than the threshold period, upon a satisfaction of the condition (ii) and a condition (iii) that it is determined that the cache data is valid, outputting the volume indicated by the cache data; and upon a satisfaction of the condition (ii) and a condition (iv) that it is determined that the cache data is invalid, acquiring, from the server, the volume of the products or services;

storing the acquired volume in the memory device as the cache data; and outputting the volume acquired from the server.

\* \* \* \* \*